United States Patent
Ito et al.

[15] 3,680,411
[45] Aug. 1, 1972

[54] AUTOMATIC SHIFT CONTROL SYSTEM FOR AUTOMATIC TRANSMISSION

[72] Inventors: Shin Ito, 10, Toyotacho; Seitoku Kubo, 8, Toyotacho, both of Toyota, Japan

[22] Filed: March 20, 1970

[21] Appl. No.: 21,351

[30] Foreign Application Priority Data

Jan. 4, 1969 Japan..........................44/25030

[52] U.S. Cl......................................74/866, 74/869
[51] Int. Cl. ...............................................B60k 21/00
[58] Field of Search.........................................74/866

[56] References Cited

UNITED STATES PATENTS 3,448,640  6/1969  Nelson..........................74/866
3,267,762  8/1966  Reval..........................74/866 X
3,301,085  11/1967  De Castelet....................74/866
3,433,101  3/1969  Scholl et al. ....................74/866

*Primary Examiner*—Arthur F. McKeon
*Attorney*—Cushman, Darby & Cushman

[57] ABSTRACT

A shift signal control system having an engine torque responsive signal generator, a vehicle speed responsive signal generator, and a plurality of discriminating circuits generating an output signal when one of these two signals or the relation between these two signals satisfies a predetermined condition. At least one of the discriminating circuits is disconnectably connected with an OR circuit through a switch while the remaining discriminating circuits are directly connected with the OR circuit so that an output signal is delivered from the OR circuit for carrying out ratio changes in response to the application of at least one of the output signals from the discriminating circuits.

18 Claims, 22 Drawing Figures

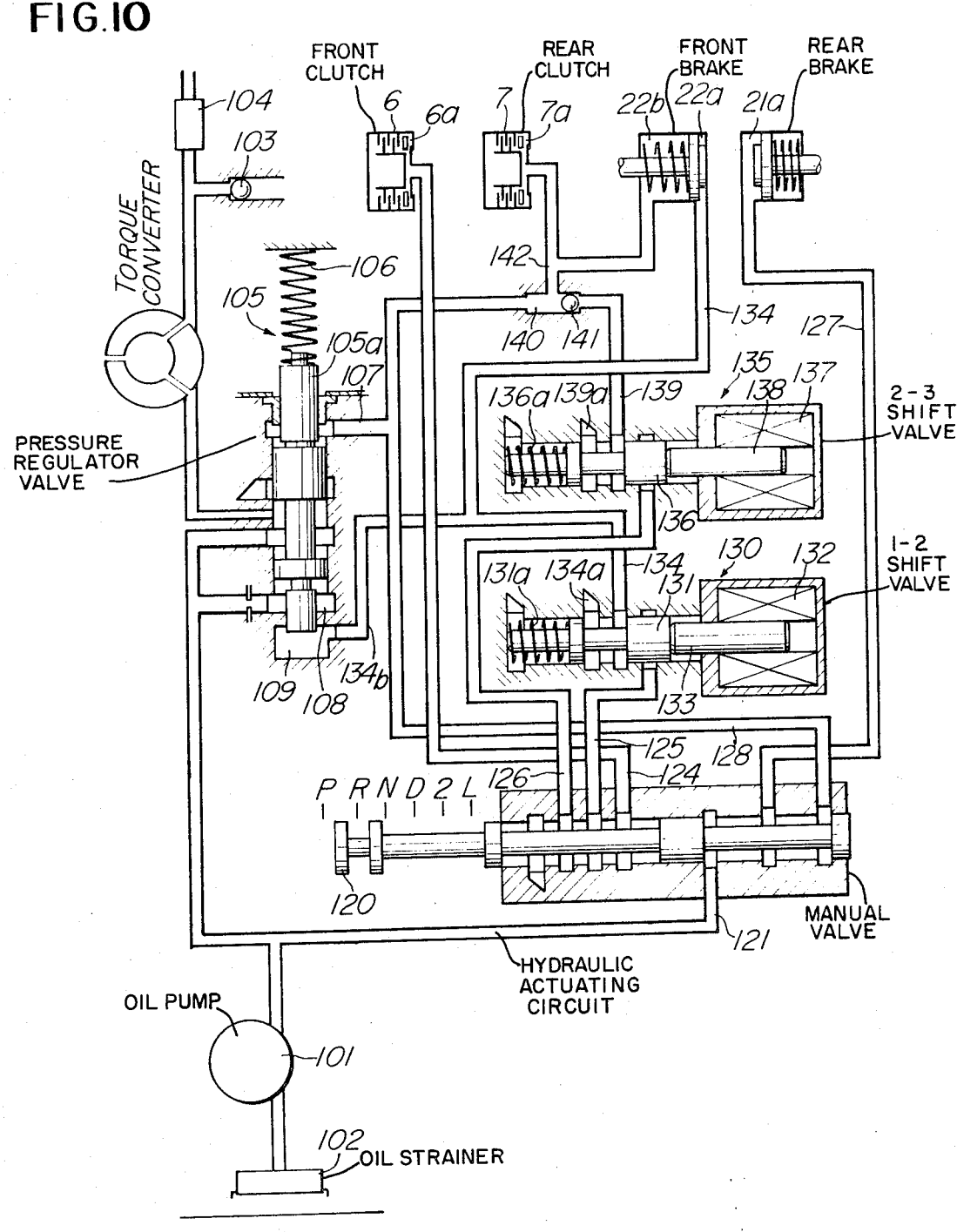

AUTOMATIC SHIFT CONTROL SYSTEM FOR AUTOMATIC TRANSMISSION

This invention is an improvement on the subject matter set forth in the copending Wakamatsu et al. application, Ser. No. 874,934 filed Nov. 7, 1969, and relates to automatic transmissions for automotive vehicles and the like, and more particularly to an automatic shift control system comprising a combination of electrical and fluid control means for use in an automatic transmission.

Automatic transmissions generally employed heretofore generally relied on fluid pressure for carrying out all the complex vehicle functions including shifting. Thus, the signal detection system in such an automatic transmission is generally complex in structure and the detected signals in the form of a fluid differential is subject to errors and therefore generally so inaccurate that accurate control is not possible. Further, the hydraulic actuating circuit in such a transmission is also so complex in structure that it is not easy to improve it.

The conventional automatic transmission involved various disadvantages due to the fact that only one set of shift points or only one shift pattern existed for a shift between low and high gear. More precisely, a shift pattern suitable for normal driving on a level road was commonly provided in the conventional automatic transmission and it was thus impossible to select a suitable automatic shift pattern among automatic shift patterns depending on the driving condition of the vehicle or at the discretion of the driver. Suppose, for example, that a vehicle equipped with a conventional three-forward speed automatic transmission enters a mountainous area while driving in the third gear of a relatively low speed range and starts to run up an incline. Since, in this case, the running resistance is increased and the accelerating force gradually decreases, the driver normally kicks down the accelerator pedal into downshift to second gear. Subsequently, however the release of the force imparted to the accelerator pedal at a curve or the like immediately causes an upshift to third gear resulting in an abrupt and undesirable reduction in accelerating power. In order to avoid this, the vehicle should continue to run in second gear without being upshifted into third gear. It is thus impossible under these circumstances with the conventional transmission to carry out a suitable shifting pattern by adjusting the amount of depression of the accelerator pedal.

It is therefore an object of the present invention to provide an electrically controlled shift signal control system for an automatic transmission in which a plurality of automatic shift patterns are provided so that a suitable automatic shift pattern can be selected in accordance with different driving conditions to carry out an automatic shift best suited to any particular driving condition.

Another object of the present invention is to provide a shift signal control system comprising means for generating an engine torque responsive signal, means for generating a vehicle speed responsive signal, a plurality of discriminating circuits generating an output signal when one of these two signals generated by said signal generating means or the relation between said two signals satisfies a predetermined condition, switch means connected with the output of at least one of said discriminating circuits for permitting or interrupting the delivery of the output signal from said discriminating circuit, and an OR circuit connected with at least one of said discriminating circuits through said switch means and with the remainder of said discriminating circuits directly so as to carry out ratio changes when at least one of the output signals from said discriminating circuits is applied thereto.

Thus, according to the present invention, a suitable shift pattern among a plurality of shift patterns can be freely selected depending on the driving condition of the vehicle by virtue of the provision of a plurality of discriminating circuits and a switching means as described above. By this arrangement, a suitable shift point (line) can be selected depending on the driving condition of the vehicle or on the preference of the driver by merely suitably turning and switching means on or off. Thus, the automatic shift control system according to the present invention is advanced compared with prior art automatic transmissions primarily in that it has a variety of automatic shift points.

The above and other objects, features and advantages of the present invention will be readily apparent from the following detailed description of a preferred embodiment thereof taken in conjunction with the accompanying drawings, in which.

Figure 11:
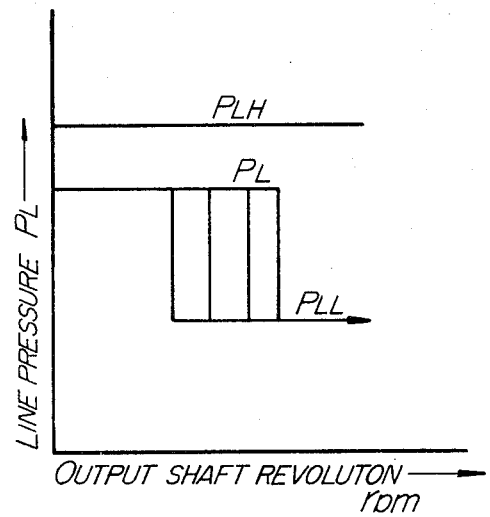
Figure 4:
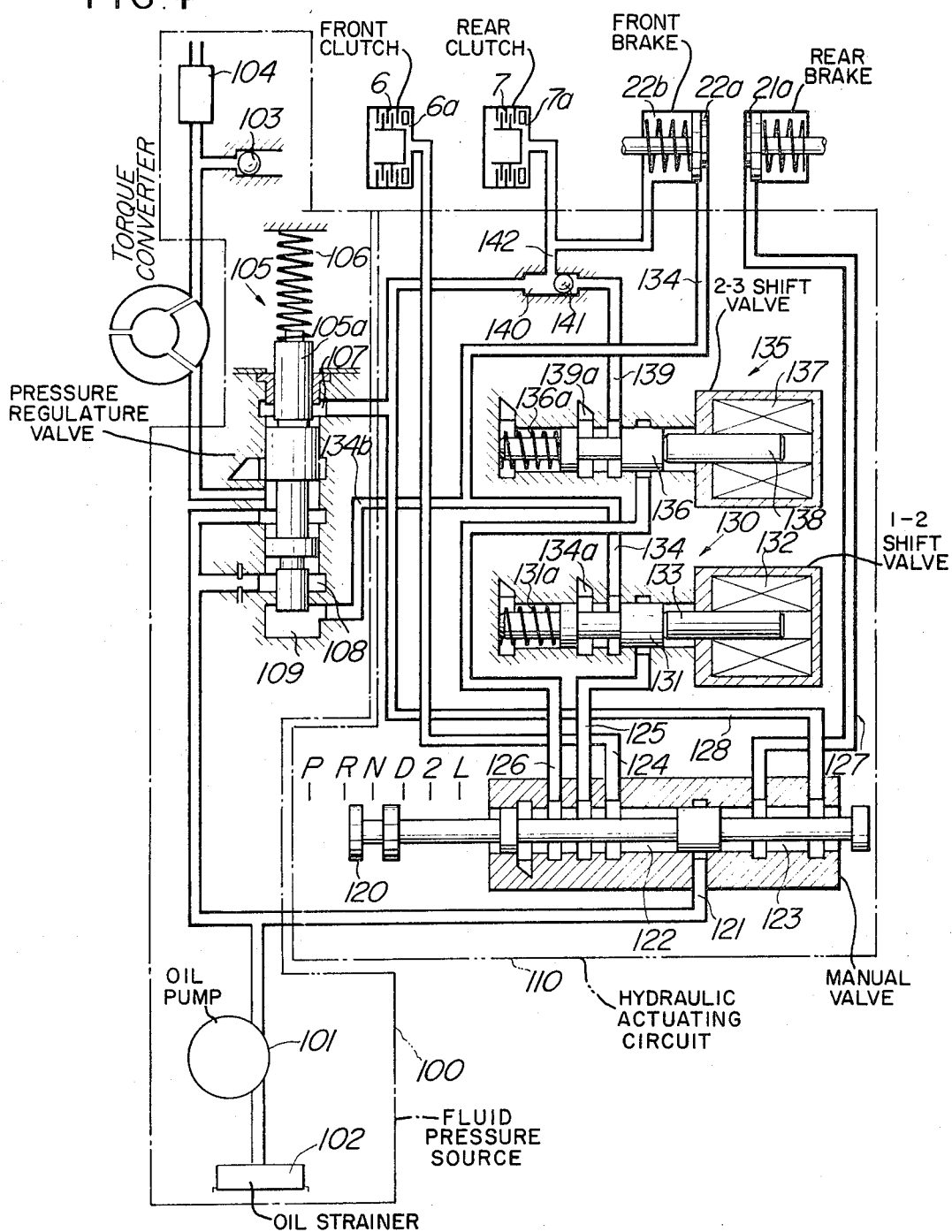
Figure 5:
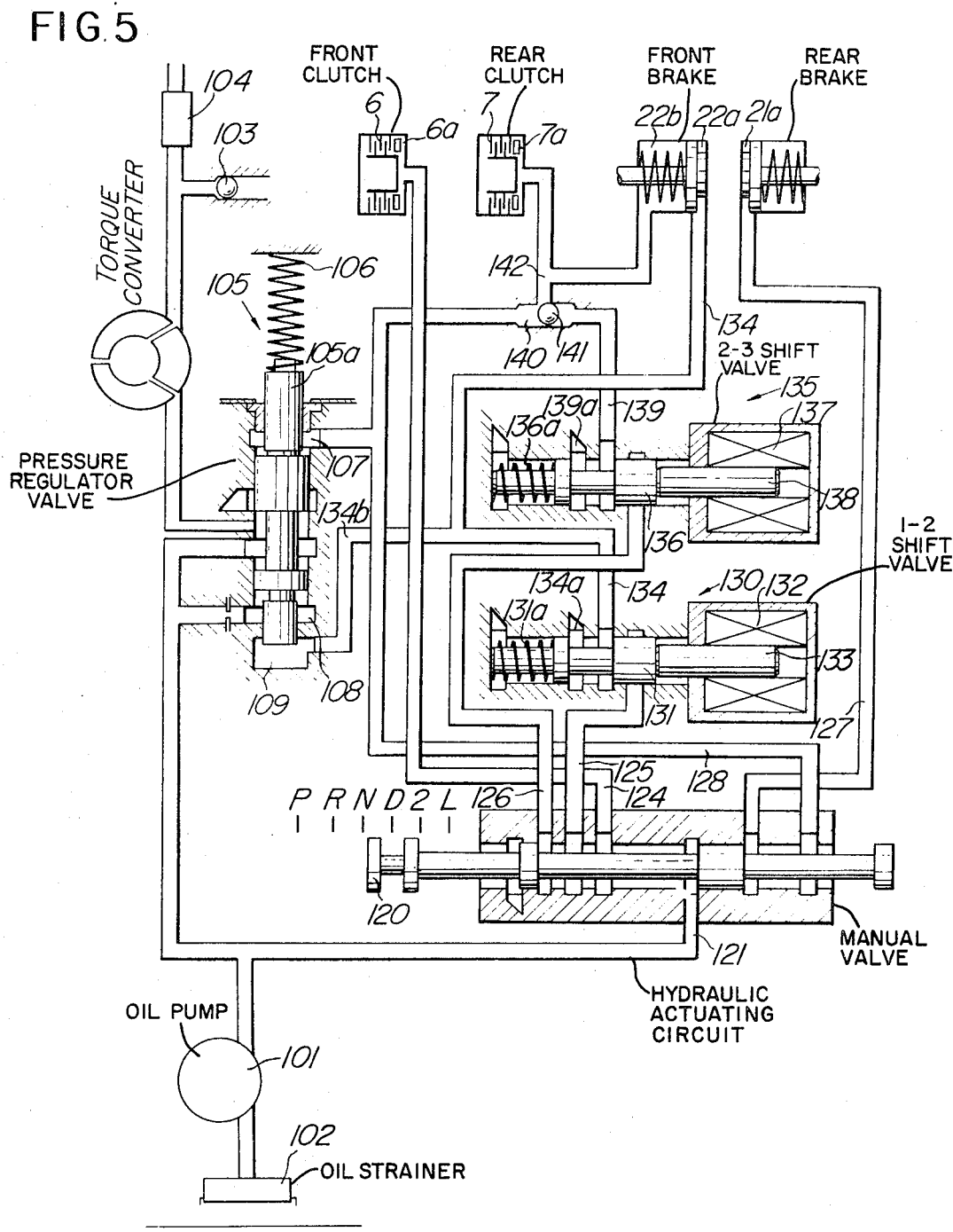
Figure 6:
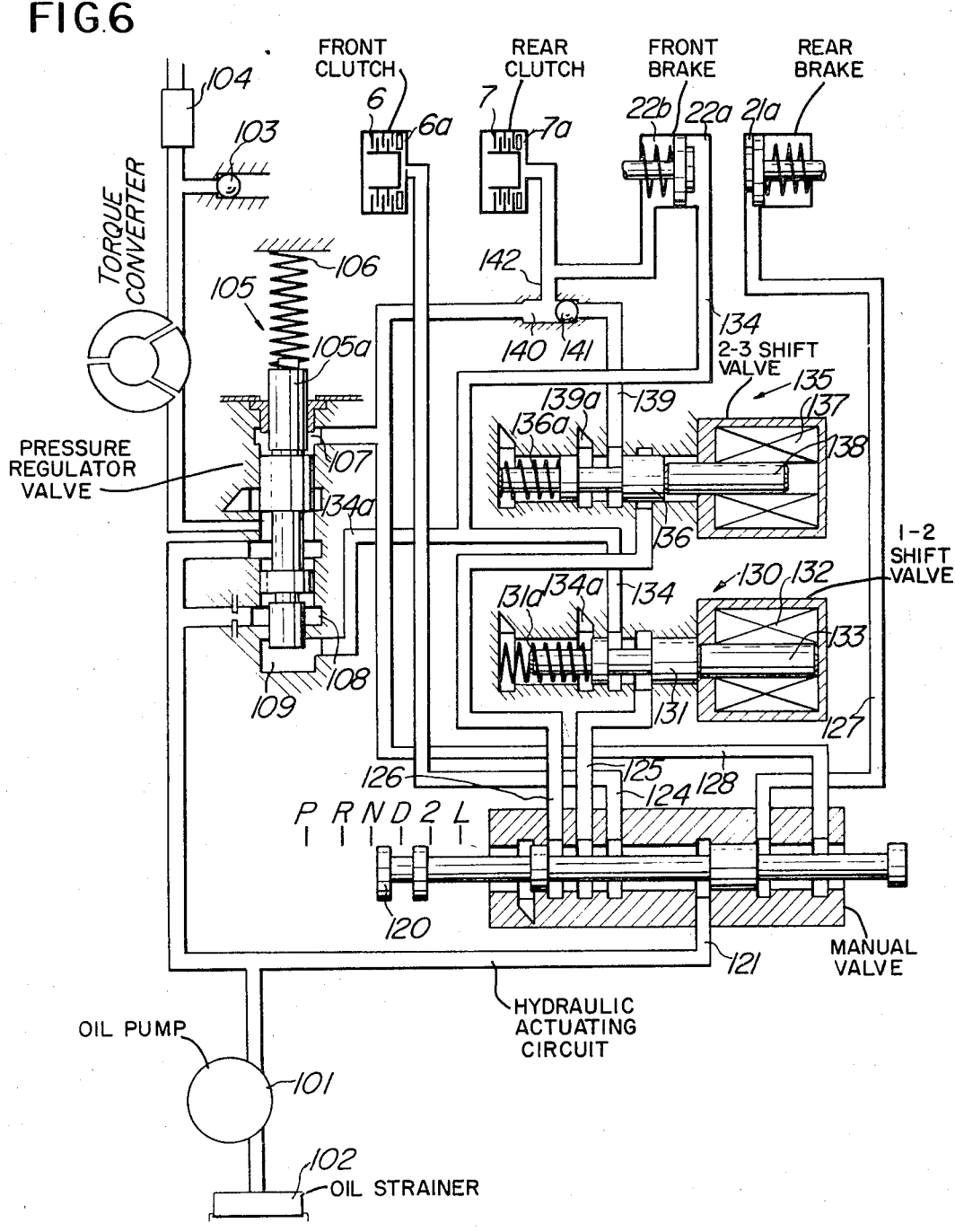
Figure 7:
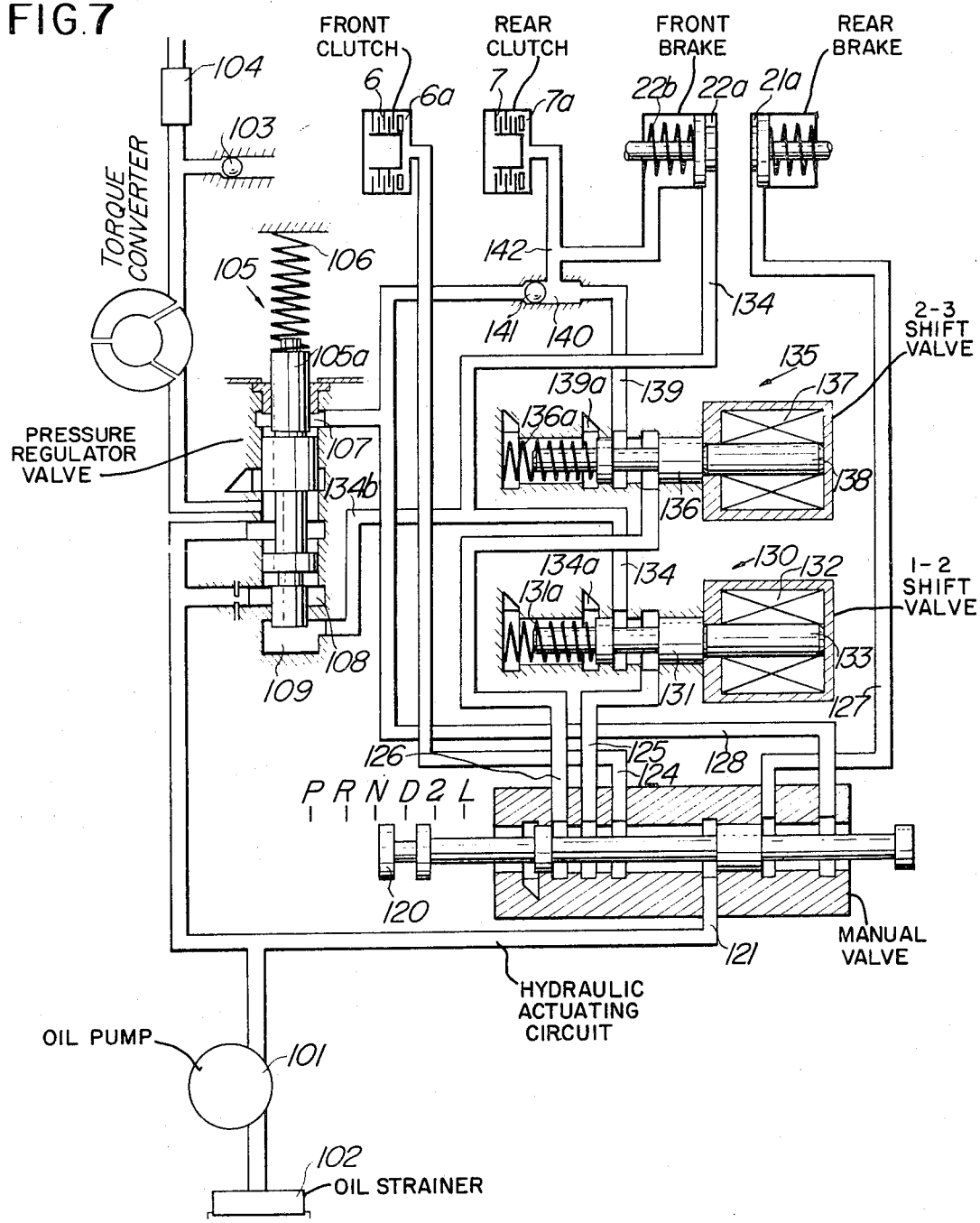
Figure 8:
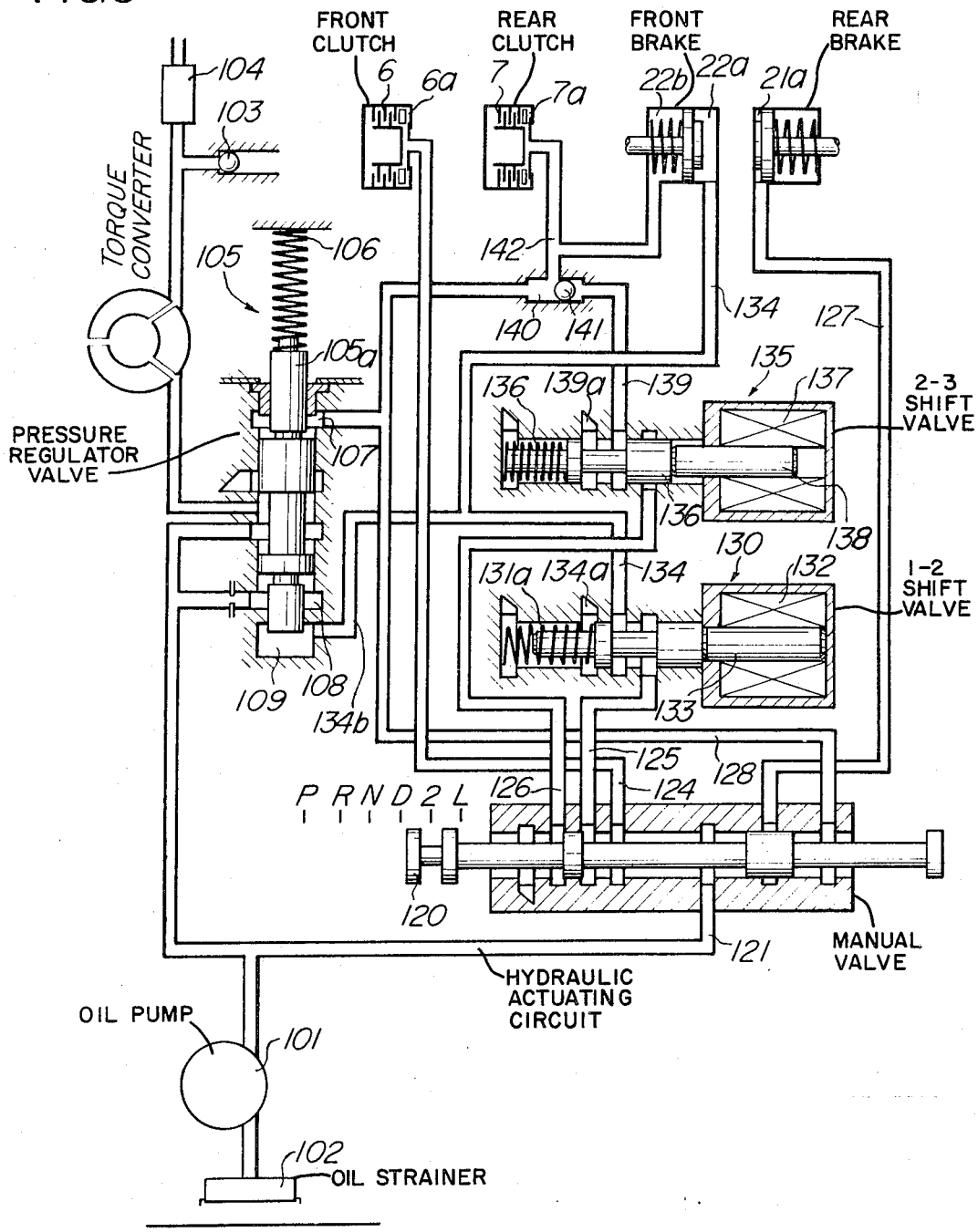
Figure 9:
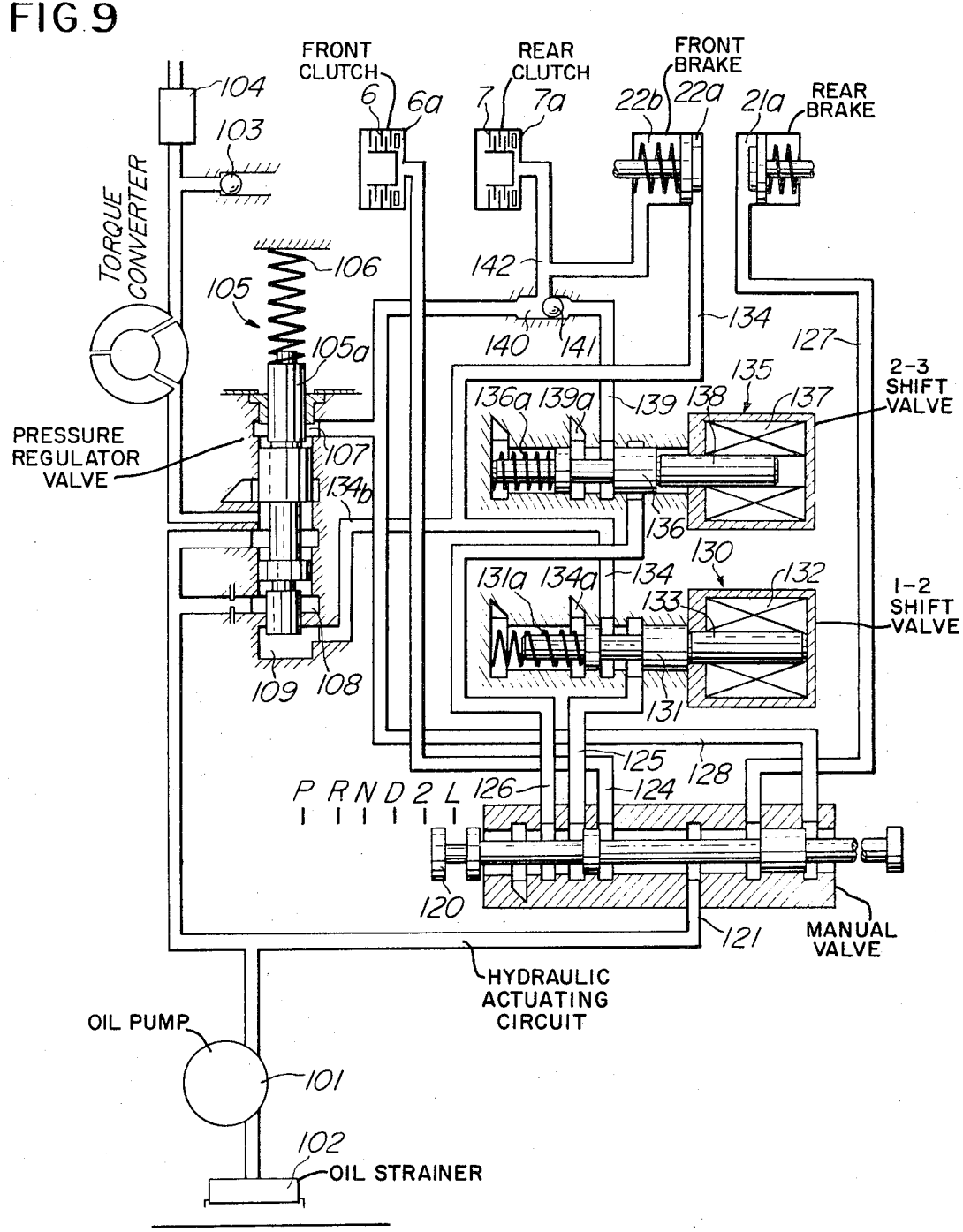
Figure 12:
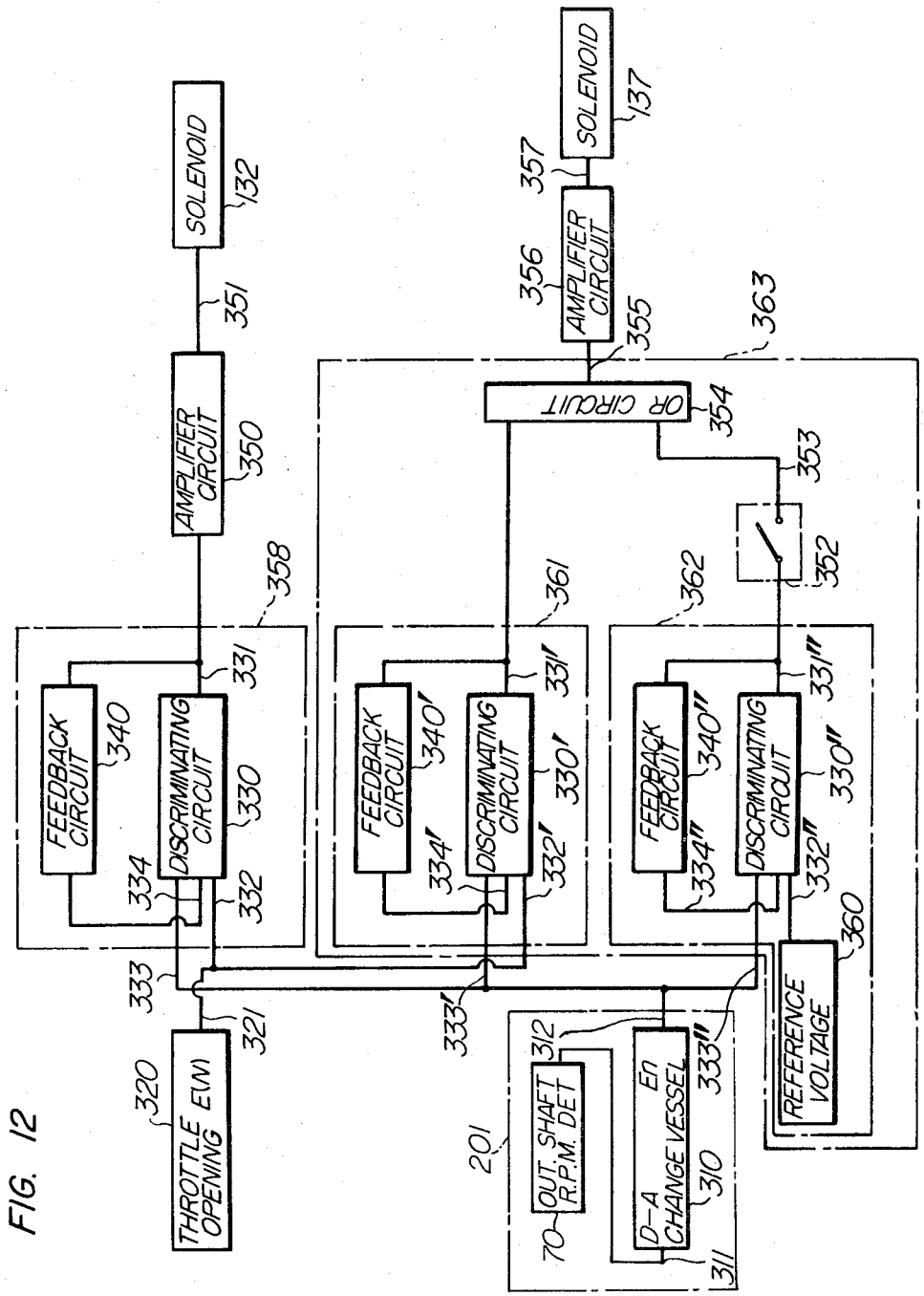
Figure 13A:
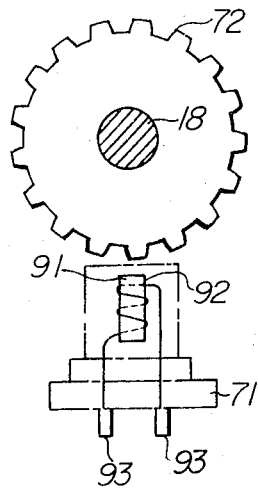
Figure 13B:
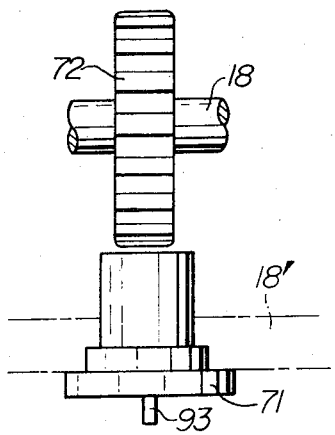
Figure 14:
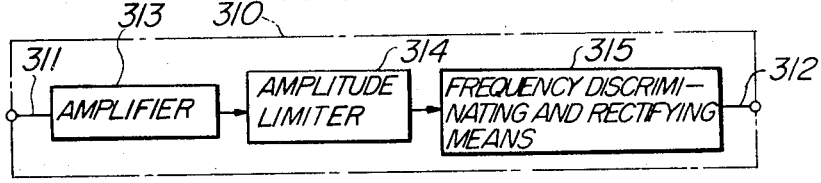
Figure 15A:
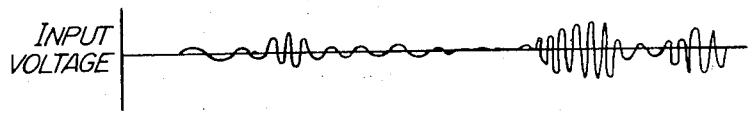
Figure 15B:
Figure 15C:
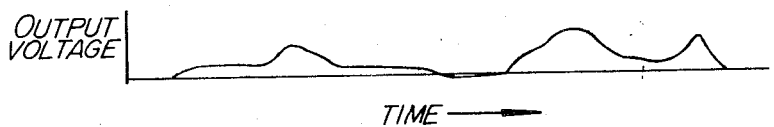
Figure 16:
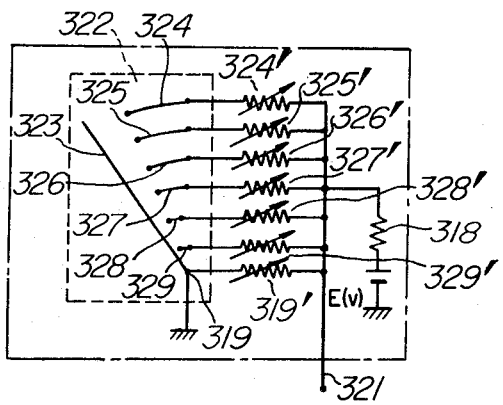
Figure 17:
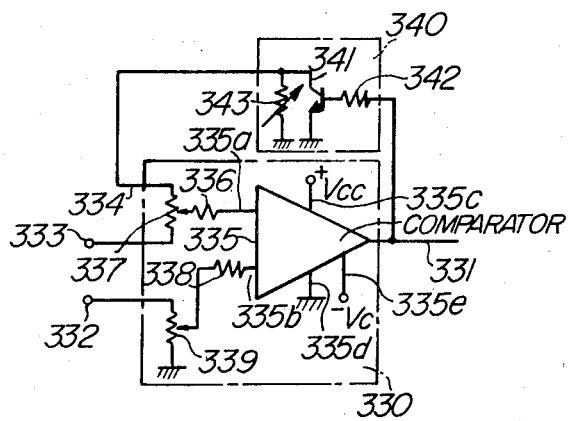
Figure 18:
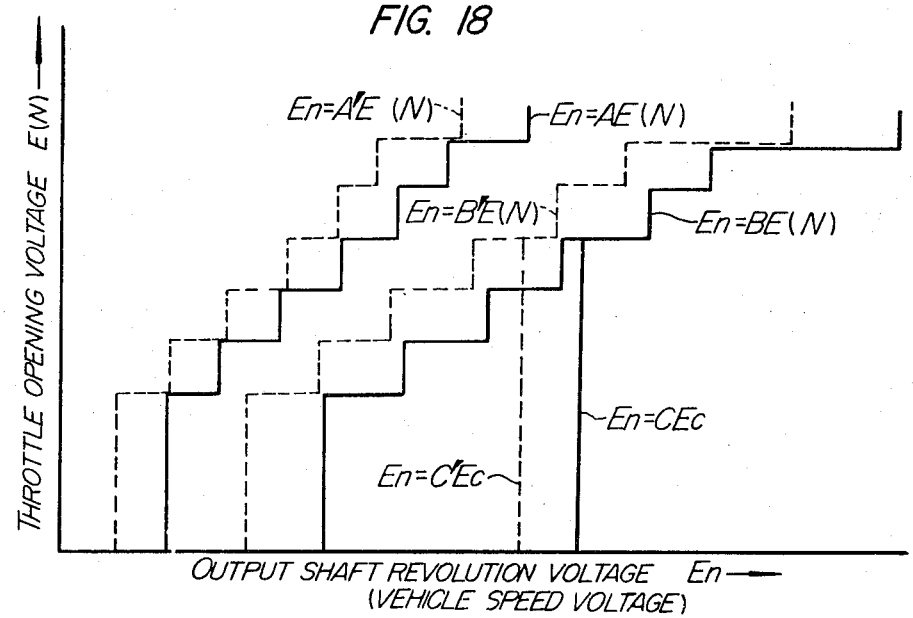
Figure 19:
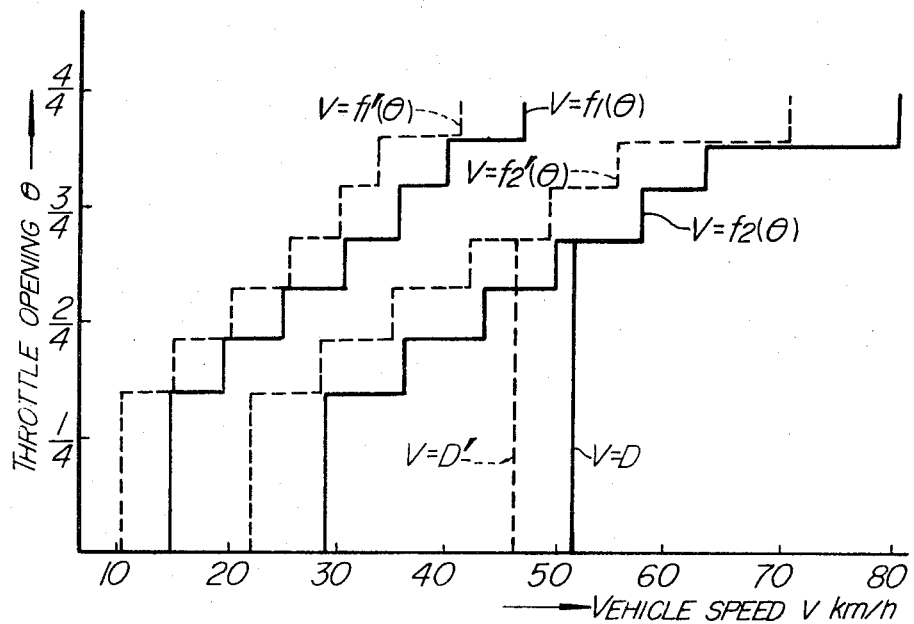

FIGS. 4 through 10 are diagrammatic views illustrating the operating state at various positions of a hydraulic actuating circuit in the automatic transmission according to the present invention, wherein FIG. 4 illustrates the operating state at the N position, FIG. 5 the operating state at the D position-1st speed, FIG. 6 the operating state at the D position-2nd speed, FIG. 7 the operating state at the D position-3rd speed, FIG. 8 the operating state at the 2 position-2nd speed, FIG. 9 the operating state at the L position, and FIG. 10 the operating state at the R position;

FIG. 11 is a chart showing the variation in the line pressure PL controlled by the hydraulic actuating circuit relative to the r.p.m. of the output shaft;

FIG. 12 is a block diagram of a shift signal control system preferably used in the automatic transmission of the present invention;

FIGS. 13a and 13b are a side elevational view and a front elevational view, respectively, of an r.p.m. detector preferably used in the shift signal control system;

FIG. 14 is a block diagram showing the structure of a digital-analog converter preferably used in the shift signal control system;

FIGS. 15a, 15b and 15c are graphic illustrations of the operating voltage waveforms appearing in the digital-analog converter shown in FIG. 14;

FIG. 16 is a circuit diagram showing the structure of a throttle position responsive circuit employed in the shift signal control system;

FIG. 17 is a circuit diagram showing the structure of a discriminating circuit and an associated feedback circuit employed in the shift signal control system;

FIG. 18 is a chart showing the relation between a signal representing the output shaft r.p.m. and a signal representing the throttle position for determining the shift regions according to the present invention; and FIG. 19 is a shift diagram showing one example of the shift regions according to the present invention.

Figure 1:
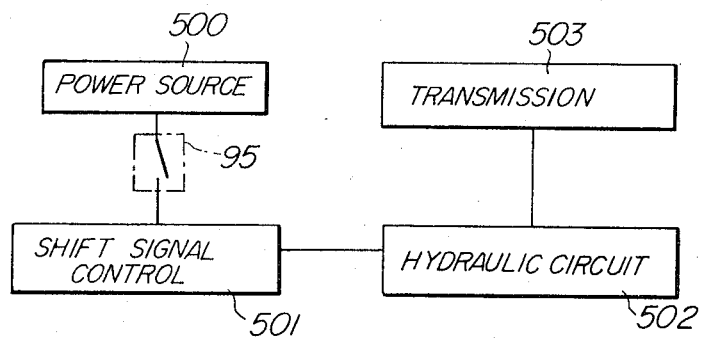
FIG. 1 is a block diagram of an automatic transmission embodying the present invention.

Referring to FIG. 1, the automatic transmission embodying the present invention including a source of electrical power supply 500, a shift signal control system 501, a switch 95 connecting the shift signal control system 501 with the electrical power source 500, a hydraulic actuating system 502 and a transmission unit 503. These components are described in detail hereunder.

STRUCTURE OF TRANSMISSION

Figure 2:
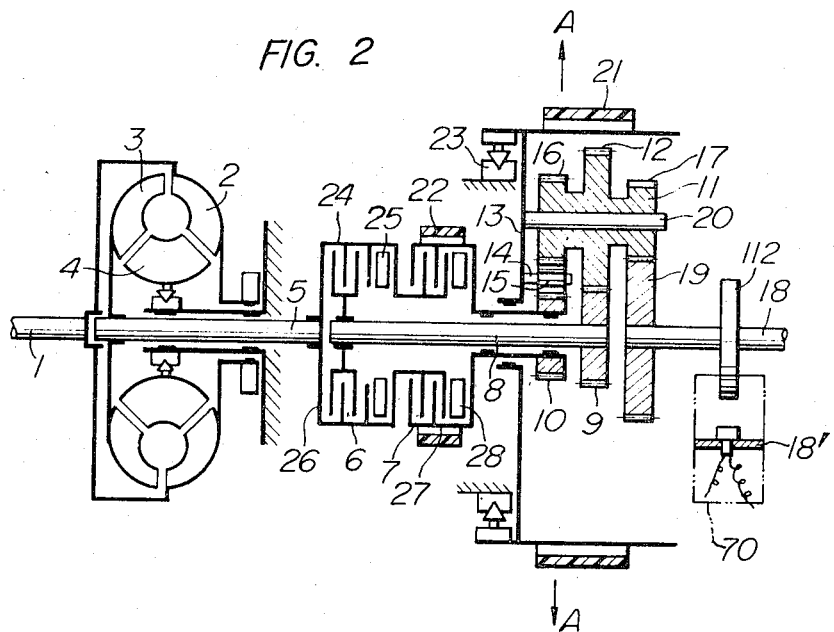
FIG. 2 is a schematic sectional view of a transmission unit in the automatic transmission of the present invention.

A torque converter automatic transmission having three forward speeds and one reverse speed as shown in FIG. 2 is taken as a typical example of an automatic transmission. In FIG. 2, the structure of the fluid controlled automatic transmission is schematically shown.

A torque converter unit includes a pump impeller 2 directly connected to the crankshaft 1 of an engine. The power developed by the engine is transmitted from the pump impeller 2 to a turbine impeller 3 through an hydraulic fluid, and the fluid is returned to the pump impeller 2 guided by a stator 4. A rotational force can be continuously derived from a turbine shaft 5 by the flow of the fluid. This rotational force is transmitted from the turbine shaft 5 to a gear unit disposed at the output side of the torque converter unit. As is commonly known, multiple disc clutch means 6 and 7 and brake band means 21 and 22 are automatically controlled by a fluid pressure supplied from the associated servo means as required and these cooperate with a planetary gear mechanism to provide three forward speeds and one reverse speed.

The structure of the gear unit disposed at the output side of the torque converter unit will now be described. The turbine impeller 3 is connected to the turbine shaft 5 which acts as the power input shaft of the planetary gear mechanism. The turbine shaft 5 is splined to a drum 24 for unitary rotation therewith. Disposed within the drum 24 is a multiple disc clutch 6 (hereinafter to be referred to as a front clutch) which is engaged by means of a piston 25 actuated by fluid pressure and which is released by means of back-up springs. The drive plates of the front clutch 6 are externally splined to engage the internally splined portion of the drum 24, and the clutch discs are internally splined to engage the externally splined portion of a hub 26 so as to be locked against free rotation. The hub 26 is internally splined to engage the externally splined portion of an intermediate shaft 8. The clutch discs of a multiple disc clutch 7 (hereinafter to be referred to as a rear clutch) are internally splined to engage the externally splined portion of the front clutch drum 24 as shown so as to be locked against free rotation. Thus, the clutch discs of the rear clutch 7 rotate in unison with the front clutch drum 24. The driven plates of the rear clutch 7 are externally splined to engage with the internally splined portion of a clutch drum 27 of the rear clutch 7.

The rear clutch 7 is engaged by means of a fluid pressure actuated piston 28 and it is disengaged when the fluid pressure applied to piston 28 is released.

Figure 3:
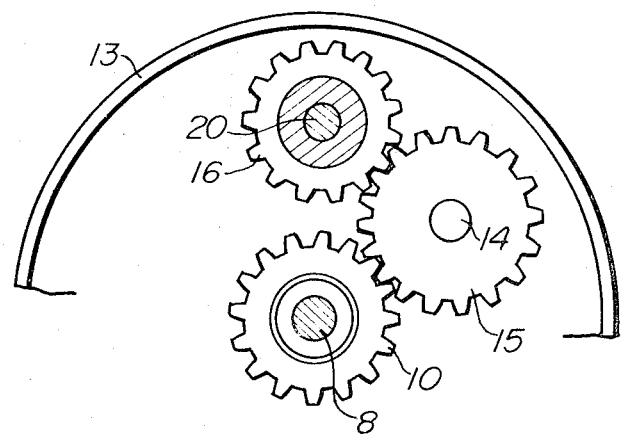
FIG. 3 is an enlarged sectional view taken on the line A—A in FIG. 2 with parts cut away to show in detail the relation between an idler gear not shown in FIG. 2 and the sun gear and planet pinion.

The intermediate shaft 8 which is splined to the hub 26 of the front clutch 6 is connected at its rear end to an input sun gear 9. The rear clutch drum 27 is fixed to a reverse sun gear 10 by a suitable locking means. The input sun gear 9 meshes with each gear 12 of a plurality of, for example, two or three planet pinions 11. The reverse sun gear 10 meshes with idler gears 15 (shown in FIG. 3) which are each rotatably mounted on a pin 14 fixed at one end to a carrier 13, and the idler gears 15 in turn meshes with gears 16 of the planet pinions 11.

The rearmost gear 17 of each planet pinion 11 meshes with a gear 19 mounted at the front end of an output shaft 18 of the transmission. The planet pinions 11 having the gears 16, 12 and 17 and the idler gears or pinions 15 are carried by the carrier 13 by means of pinion pins 20 and 14, respectively. A brake band 21 (hereinafter to be referred to as a rear brake band) encircles the carrier 13 for applying a brake to the latter, and thus the carrier 13 can be fixed against rotation and allowed to freely rotate by fastening and releasing the rear brake band 21 respectively. Similarly, a brake band 22 (hereinafter to be referred to as a front brake band) encircles the rear clutch drum 27 so that the rear clutch drum 27, and hence the reverse sun gear 10 can be fixed against rotation and allowed to freely rotate by fastening or releasing the front brake band 22 respectively. A one-way clutch 23 associated with the carrier 13 functions in a manner similar to the rear brake band 21 in low gear as set forth hereunder.

With the above structure, three forward speeds and one reverse speed can be obtained by selectively actuating the elements described above in a manner as follows:

First speed — The front clutch 6 and the rear brake band 21 are actuated. (However, when the transmission is driven from the engine, the rear brake band 21 may not be actuated, since the one-way clutch 23 is actuated to give the same result as that obtained with the actuation of the rear brake band 21. In this case, however, no driving force is transmitted from the output shaft 18.) With the front clutch 6 and the rear brake band 21 so actuated, the rotation of the turbine shaft 5 is directly transmitted to the input sun gear 9 through the front clutch 6. Due to the fact that the carrier 13 is locked against rotation by the rear brake band 21, the pinion pins 20 are also held stationary and the rotation of the turbine shaft 5 is transmitted from the gear 9 to the gears 12, thence through the gears 17 to the gear 19 on the output shaft 18 in a speed reducing relation similar to that of an ordinary gear train, thereby providing the first speed.

Second speed — The front clutch 6 is kept actuated and the front brake band 22 is actuated while releasing the rear brake band 21. Thus, the input sun gear 9 is rotated in unison with the turbine shaft 5, but the rear clutch drum 27, hence the reverse sun gear 10 is locked against rotation by the front brake band 22. In this state, the rotation of the turbine shaft 5 is directly transmitted to the input sun gear 9, and the sun gear 9 urges the pinions 11 to rotate in a direction (counterclockwise) opposite to the direction of rotation (clockwise) of the turbine shaft 5. The planet pinions 11 rotating in this direction try to rotate the idler gears 15 clockwise through the gears 16. However, due to the fact that the gear 10 meshing with the gears 15 is locked against rotation, the pinion pin 14 revolves clockwise around the gear 10. This revolving motion is imparted to the rotation of the input sun gear 9 and the gear 19 carried by the output shaft 18 which gears are coaxial with and rotate in the same direction as the turbine shaft 5. Since the number of teeth of the gear 12 is selected to be greater than the number of teeth of the gear 17, the number of revolutions of the intermediate shaft 8 is greater than that of the output shaft 18. In other words, the output shaft 18 is rotated at a reduced speed or second speed.

Third speed — The third speed can be obtained by engaging both the front and rear clutches 6 and 7. The input sun gear 9 and the reverse sun gear 10 are rotated in unison and the whole planetary gear system is unitarily rotated so that the output shaft 18 is rotated at the same speed of rotation as the turbine shaft 5.

Reverse — When reversing, the rear clutch 7 and the rear brake band 21 are actuated. The carrier 13, hence the pinion pins 14 and 20 are thereby locked against revolution, and the rotation of the turbine shaft 5 is transmitted through the rear clutch 7 to the reverse sun gear 10, thence through the pinions 15 and 17 to the gear 19 mounted on the output shaft 18 so that the output shaft 18 is rotated in the reverse direction.

HYDRAULIC ACTUATING SYSTEM

The arrangement of a hydraulic actuating system for use in an automatic transmission mechanism according to the present invention is diagrammatically shown in FIGS. 4 through 10. Briefly, the hydraulic actuating system comprises a fluid pressure source 100 and a hydraulic actuating circuit 110. The hydraulic actuating circuit 110 includes a manual valve 120, a 1-2 shift means 130, a 2-3 shift means 135, a check valve 140 and fluid passages. The fluid pressure source 100 includes an oil pump 101, an oil strainer 102, a pressure regulator valve 105, a check valve 103, an oil cooler 104 and fluid passages. The fluid pressure source 100 functions to supply fluid under pressure to the torque converter, to the gears for lubricating same and to the hydraulic actuating circuit 110.

The manual valve 120 is connected with a shift lever (now shown) disposed adjacent to the driver's seat and takes one of the P, R, N, D, 2 and L positions. When now the manual valve 120 takes the N position, a fluid passage 121 is closed and valve chambers 122 and 123 are exhausted as seen in FIG. 4. At the D position of the manual valve 120, the fluid passage 121 communicates with fluid passages 124, 125 and 126 as seen in FIG. 5. The fluid passage 124 leads directly to a front clutch servo chamber 6a, and the fluid passage 125 leads to the apply side 22a of a servo for the front brake band 22 through the 1-2 shift means 130, while the fluid passage 126 leads to a rear clutch servo chamber 7a and to the release side 22b of the servo for the front brake band 22 through the 2-3 shift means 135 and the check valve 140. The 1-2 shift means 130 includes a 1-2 shift valve element 131 and a solenoid 132. One end (or the right-hand end as viewed in the drawing) of the valve element 131 is abutted by a moving core 133 of the solenoid 132. When no current is supplied to the solenoid 132, the valve element 131 is urged to its rightward position by a spring 131a which engages the other or left-hand end of the valve element 131 so that the fluid passage 125 communicates with a fluid passage 134 to supply fluid to the apply side 22a of the servo for the front brake band 22 to apply the front brake band 22. When current is supplied to the solenoid 132, the moving core 133 urges the valve element 131 to the leftward position by being actuated by the electromagnetic force of the solenoid 132 so that the communication between the fluid passages 125 and 134 is interrupted and the fluid passage 134 communicates with a pressure discharge port 134a to release the front brake band 22. Similarly, the 2-3 shift means 135 includes a 2-3 shift valve element 136 and a solenoid 137. One end (or the right-hand end as viewed in the drawing) of the valve element 136 is engaged by a moving core 138 of the solenoid 137. When no current is supplied to the solenoid 137, the valve element 136 is urged to its rightward position by a spring 136a engaging the other or left-hand end of the valve element 136 so that the fluid passage 126 communicates with a fluid passage 139 to force a check ball element 141 of the check valve 140 towards the fluid passage 128 to block the fluid passage 128. As a result, the fluid passage 139 communicates with fluid passage 142 to supply fluid to the rear clutch servo chamber 7a and to the release side 22b of the servo for the front brake band 22 so as to engage the rear clutch 7 and release the front brake band 22. When current is supplied to the solenoid 137, the valve element 136 is urged leftward so that the communication between the fluid passages 126 and 139 is interrupted and the fluid passage 139 communicates with a pressure discharge port 139a to be exhausted.

In the first speed at the drive range position or D position — 1st speed shown in FIG. 5, both the solenoids 132 and 137 are energized and the front clutch 6 is solely engaged by the fluid supplied to the front clutch servo chamber 6a through the fluid passage 124. Accordingly, when the transmission is driven from the engine, the one-way clutch 23 is actuated to lock the carrier 13 against rotation so that the first speed can be obtained. In this case, however, no driving force can be transmitted from the output shaft since a freewheeling action takes place.

In the second speed at the drive range position or D position—2nd speed shown in FIG. 6, the fluid passage 124 leading to the front clutch servo chamber 6a is kept pressurized and the solenoid 132 for the 1-2 shift valve element 131 is de-energized with the result that the fluid passage 125 communicates with fluid passage 134 to supply fluid to the apply side 22a of the servo for the front brake band 22 to apply the front brake band 22. Thus, the second speed can be obtained.

In the third speed at the drive range position or D position—3rd speed shown in FIG. 7, the solenoid 137 for the 2-3 shift valve element 136 is de-energized in addition to the previous de-energization of the solenoid 132 in the D position—2nd speed with the result that the fluid passage 126 communicates with the fluid passage 139 to supply fluid to the rear clutch servo chamber 7a to engage the rear clutch 7 while releasing the front brake band 22. Thus, the third speed can be attained.

When the manual valve 120 is urged to the 2 position shown in FIG. 8, the fluid passage 126 leading to the 2-3 shift means 135 is exhausted and the fluid passages 124 and 125 communicate solely with the fluid pressure source 100. Accordingly, it is impossible to obtain the third speed, regardless of the de-energization of the solenoid 137 for the 2-3 shift valve element 136 and the first and second speeds can be obtained depending on the energization and de-energization of the solenoid 132 for the 1-2 shift valve element 131.

When the manual valve 120 is urged to the L position shown in FIG. 9, the fluid passages 125 and 126 are exhausted and the fluid passages 124 and 127 communicate with the fluid pressure source 100. As a result, fluid is supplied to the front clutch servo chamber 6a and to the apply side 21a of a servo for the rear brake band 21 to engage the front clutch 6 and apply the rear brake band 21. Thus, the first speed can be obtained. The first speed in this case differs from the first speed in the D position in that the rear brake band 21 is applied to allow for the transmission of the driving force from the output shaft to the engine thereby permitting engine braking.

When the manual valve 120 is moved to the R position shown in FIG. 10, the fluid passages 124, 125 and 126 are exhausted and the fluid passages 127 and 128 communicate with the fluid pressure source 100. As a result, fluid is supplied to the rear clutch servo chamber 7a and to the apply side of the servo for the rear brake band 21 to engage the rear clutch 7 and apply the rear brake band 21. Thus, the reverse drive condition for the vehicle can be obtained.

It will be understood from the foregoing description that the hydraulic actuating system in the present invention is featured by the fact that it comprises a novel combination of a hydraulic circuit arrangement and biasing means in the form of springs 131a and 136a for biasing the 1-2 shift valve element 131 and the 2-3 shift valve element 136 to the upshift position in response to de-energization of the respective solenoids 132 and 137. The circuit arrangement of the hydraulic actuating system is such that, in the first, second and third speed at the D position of the manual valve 120, fluid pressure from the fluid pressure source 100 is supplied to the front clutch servo chamber 6a through the fluid passage 124, to the apply side 22a of the servo for the front brake band 22 through the fluid passage 125 and the 1-2 shift means 130, and to the rear clutch servo chamber 7a for the rear clutch 7 and to the release side 22b of the servo for the front brake band 22 through the fluid passage 126 and the 2-3 shift means 135, respectively.

In the 2 position of the manual valve 120, the fluid passage 126 leading to the 2-3 shift means 135 is exhausted and fluid passages 124 and 125 both communicate with the fluid pressure source 100, which in the L position of the manual valve 120, the fluid passage 125 leading to the 1-2 shift means 130 is further exhausted and the fluid passage 124 leading to the front clutch servo chamber 6a for the front clutch 6 and the fluid passage 127 leading to the apply side 21a of the servo for the rear brake band 21 communicate with the fluid pressure source 100. By virtue of the above combination, even when the power supplied from the electrical power source to the shift signal control system is interrupted, the manual valve 120 may be urged to the L position for obtaining the first speed, to the 2 position for obtaining the second speed and to the D position for obtaining the third speed. Such a hydraulic circuit arrangement is quite advantageous in that, when trouble occurs in the shift signal control system which controls the supply of electrical signals to the solenoids or when the driver wishes a sporty drive with a variety of speed changes compared with those carried out on the basis of the shift points set for the electrical control system, the driver may turn off the switch connecting the voltage source with the shift signal control system to cut off the supply of power to the shift signal control system thereby rendering the shift signal control system inoperative and may then shift the shift lever to one of the L, 2 and D positions so as to select the speed ratio desired by the driver. In other words, the switch may be turned on and off to select either a fully automatic or a manual drive as desired.

A second feature of the present invention resides in the fact that the freewheeling drive appears in the D position-1st speed so as to ensure protection against any erratic first speed signal that may be supplied from the shift signal control system under high speed driving.

A third feature of the present invention resides in the fact that the solenoids 132 and 137 are in the de-energized state during running of the vehicle in the third speed gear. Therefore, it is unnecessary to consider any electrical power consumption due to operation of the solenoids as well as the undersirable generation of heat resulting in a temperature rise due to the current supplied to the solenoids.

Fluid pressure supplied to the servos is controlled by the pressure regulator valve 105. The pressure regulator valve 105 includes a valve spool 105a which is engaged at one or upper end by a spring 106. In the R position of the manual valve 120, fluid pressure is supplied through a fluid passage 128 to a valve chamber 107 surrounding the upper portion of the valve spool 105a. Spaced valve chambers 108 and 109 surround the lower portion of the valve spool 105a so that fluid pressure is supplied from the oil pump 101 to the chamber 108 and fluid pressure is supplied to the chamber 109 through a fluid passage 134b. In the D or 2 position of the manual valve 120, fluid pressure is supplied to the fluid passage 125 leading to the 1-2 shift means 130. Then, when the 1-2 shift solenoid 132 is de-energized, the valve element 131 is urged to the upshift position to establish communication between the fluid passages 125 and 134 so that fluid pressure is supplied to the chamber 109 through the fluid passage 134b. On the other hand, the chamber 107 is exhausted in all the gear positions, with the exception of the reverse position. Thus, a constant low fluid pressure $P_{LL}$, which is determined by the spring pressure of the spring 106 and fluid pressures in the chambers 108 and 109, is produced by the pressure regulator valve 105.

When the manual valve 120 is in the D or 2 position and the 1-2 shift valve element 131 is urged to the downshift position (corresponding to the first speed) by the operation of the solenoid 132 or when the manual valve 120 is in the L position, the chamber 109 of the pressure regulator valve 105 is exhausted and a constant fluid pressure $P_L$, which is determined by the spring pressure of the spring 106 and fluid pressure in the chamber 108, is produced by the pressure regulator valve 105.

In the R position of the manual valve 120, fluid pressure is supplied to the chamber 107 of the pressure regulator valve 105 through the fluid passage 128. Accordingly, a constant high fluid pressure $P_{LH}$, which is determined by the spring pressure of the spring 106 and fluid pressures in the chambers 107 and 108, is produced by the pressure regulator valve 105.

It will be understood from the above description that the fluid passage 134 leading out from the 1-2 shift means 130 is connected to the pressure reducing chamber 109 of the pressure regulator valve 105 so that the fluid pressure produced by the pressure regulator valve 105 is reduced when the 1-2 shift valve element 131 is shifted to the high gear position.

FIG. 11 shows the variation in the fluid pressure or line pressure $P_L$ produced by the pressure regulator valve 105 relative to the number of revolutions of the output shaft 18, hence the vehicle speed. As will be seen from FIG. 11, a step-down from the constant fluid pressure $P_L$ to the constant low fluid pressure $P_{LL}$ occurs in the 2 or D position of the manual valve 120 when the number of revolutions of the output shaft 18, hence the vehicle speed is increased and the speed ratio is changed from the first to the second speed. Generally, the 1-2 shift point and 2-1 shift points are variable depending on an engine torque responsive signal. Thus, the step-down point from the constant fluid pressure $P_L$ to the constant low fluid pressure $P_{LL}$ varies as shown depending on the engine torque responsive signal.

By virtue of the capability of obtaining the control pressure characterized in the manner described in detail above, a line pressure taking into consideration the torque multiplying action of the torque converter can be supplied to the servo chambers for the clutches and brake bands so as to provide a sufficient large engaging force in the low speed range, while a constant low line pressure can be supplied to the servo chambers to prevent power losses including any loss which may occur in the oil pump and other elements in the high speed range, since the torque multiplying action of the torque converter is lost in the high speed range due to the fact that the torque converter also substantially acts as a hydraulic coupling.

According to the present invention, further, the shift valve means provided for the sake of shift control acts also as a means for varying the fluid pressure control action of the pressure regulator valve 105. This eliminates the need for providing a valve (such as the so-called compensator valve or throttle relay valve) employed in prior art automatic transmissions for varying the fluid pressure control action of the pressure regulator valve and remarkably simplifies the structure of the hydraulic circuit.

It will be seen from the above description that the method of controlling the fluid pressure in the hydraulic actuating circuit employed in the automatic transmission according to the present invention has various notable features and advantages. However, the method described above is not the subject matter of the present invention as it has already been applied for a patent in a copending patent application.

It will be understood that the 1-2 shift means 130 and the 2-3 shift means 135 are operated to vary the pressure regulating action of the pressure regulator valve 105 and to carry out the automatic speed changing operation, and this is accomplished by selectively energizing and de-energizing the solenoids 132 and 137.

The selective energization and de-energization of the solenoids 132 and 137 are carried out under the control of a unique shift signal control system. The shift signal control system is the essential feature of the present invention and various objects of the present invention are attained by the unique shift signal control system.

SHIFT SIGNAL CONTROL SYSTEM

The shift signal control system which is the essential feature of the present invention includes a throttle position detecting or responsive circuit 320, an output shaft r.p.m. detecting circuit 201, a 1-2 shift point computer circuit 358, a 2-3 shift point computer circuit 363, and amplifiers 350 and 356.

The output shaft r.p.m. detecting circuit 201 includes an output shaft r.p.m. detecting means 70 and a digital-analog converter 310. The output shaft r.p.m. detecting means 70 has a structure as shown in FIGS. 13a and 13b and is composed of an r.p.m. detector 71 mounted on the transmission housing 18' and a toothed disc 72 secured integrally to the output shaft 18. The toothed disc 72 has a number of teeth of $n$, for example, $n = 32$ so that the r.p.m. detector 71 detects an electrical signal S having a frequency which is $n$ times the r.p.m. N of the output shaft 18. Thus, $S = n \times N$.

Knowing the r.p.m. $N$ of the output shaft 18 enables the speed of the vehicle to be known. The structure of the output shaft r.p.m. detecting means 70 will be described in more detail with reference to FIGS. 13a and 13b. As seen in a side elevation in FIG. 13a, the toothed disc 72 which is secured at its center of rotation to the output shaft 18 is a discal plate of magnetic material having thirty-two equally spaced teeth formed along its circumference, and the r.p.m. detector 71 is mounted on the housing 18' at a position closely adjacent to the toothed disc 72 in a direction which is diametrically opposed to the latter. The r.p.m. detector 71 is composed of a permanent magnet 91 and a coil 92 wound around the permanent magnet 91. The permanent magnet 91 and the coil 92 are housed in a suitable casing of non-magnetic material and the casing is mounted on the transmission housing 18' so that one end of the permanent magnet 91 is disposed in close proximity to the outer periphery of the toothed disc 72. As the tooth portion of the toothed disc 72 passes through the magnetic field of the permanent magnet 91 as a result of rotation of the toothed disc 72, a variation takes place in the leakage flux of the permanent magnet 91 so that an electromotive force is produced in the coil 92. In the case of the illustrated example, one complete rotation of the toothed disc 72 produces 32 voltage pulses. As described hereinbefore, a voltage signal at an A.C. voltage $S$ is generally obtained when the toothed disc 72 having $n$ teeth rotates at $N$ number of revolutions per minute. The voltage signal appears across output terminals 93. It will be apparent for those skilled in the art that, in lieu of the above manner of vehicle speed detection, a small-sized generator may be mounted in coaxial relation with the driven gear operatively connected with the speedometer cable and the output from the generator may be utilized for the vehicle speed detection.

The output voltage signal S delivered from the output shaft r.p.m. detecting means 70 is supplied to the digital-analog converter 310 through a lead 311. The digital-analog converter 310 converts the A.C. signal or digital signal S into a D.C. voltage signal or analog signal. The digital-analog converter 310 has a structure as shown in FIG. 14 the elements of which are the same as described in the Shirai et al. U.S. Pat. No. 3,572,168 (FIG. 9) and in the aforementioned Wakamatsu et al. application, Ser. No. 874,934. The input voltage signal S is supplied by the lead 311 to an amplifier 313 in which the amplitude of the signal is increased, and then the amplitude of the signal S is limited to a fixed value by an amplitude limiter 314. The A.C. voltage is then converted into a D.C. voltage by a frequency detecting, rectifying and amplifying circuit 315, and the D.C. voltage is led out by a lead 312. The voltage waveforms appearing in the circuit 310 are shown in FIGS. 15a to 15c. FIG. 15a shows the voltage waveform of the signal S and the same waveform is maintained after the signal S has been amplified. FIG. 15b shows the waveform of the output from the amplitude limiter 314. FIG. 15c shows the waveform of the output En from the frequency detecting, rectifying and amplifying circuit 315, and this output En is an analog voltage which is proportional to the r.p.m. of the output shaft 18.

The throttle position responsive circuit 320 has a structure as shown in FIG. 16. The reference numeral 322 designates a multi-contact switch which is responsive to the position of the throttle valve in the carburetor, or in other words, responsive to the degree of depression of the accelerator pedal. (This switch may respond to a displacement of a member responsive to the negative pressure in the air intake pipe since the switch is a means for detecting an engine torque responsive signal.) The multi-contact switch 322 has a movable contact 323 and a plurality of stationary contacts 324, 325, 326, 327, 328 and 329. The switch 322 is so constructed that the movable contact 323 is successively released from contact with the stationary contacts 324, 325, 326, 327, 328 and 329 as the opening $S_\theta$ of the throttle valve is successively increased to $S_{\theta(1)}$, $S_{\theta(2)}$, $S_{\theta(3)}$, $S_{\theta(4)}$, $S_{\theta(5)}$ and $S_{\theta(6)}$. The movable contact 323 is grounded at one end thereof. The stationary contacts 324, 325, 326, 327, 328 and 329 are connected at one end to the respective variable resistors 324', 325', 326', 327', 328' and 329', while one end of the variable resistor 319' is grounded. The variable resistors 324' through 319' are connected at the other end in common to the lead 321. A resistor 318 is connected at one end to a lead 321, and a fixed voltage E is applied to the other end of the resistor 318. The variable resistor 319' is so adjusted that a voltage $E_{(7)}$ appears on the lead 321 when $S_o = S_{\theta(7)}$ due to the full opening of the throttle valve in the carburetor. Then, when the throttle valve opening is reduced to $S_{\theta(6)}$, the movable contact 323 solely engages with the stationary contact 329. The variable resistor 329' is so adjusted that an output $E_{(6)}$ appearing on the lead 321 in such a position of the switch 322 is given by $\dfrac{R_6||R_7}{R_6||R_7+R}$.

$E = E(6)$, where R, $R_6$ and $R_7$ are the resistances of the resistor 331, variable resistor 329' and variable resistor 319', respectively, and $R_6 || R_7$ is the resistance given when the variable resistors 329' and 319' are connected in the circuit in parallel with each other. The variable resistor 328' is so adjusted that an output $E_{(5)}$ appearing on the lead 321 in response to the throttle valve opening of $S_{\theta(5)}$ is given by $$\dfrac{R_7||R_6||R_5}{R_7||R_6||R_5+R}.$$

$E = E_{(5)}$, where $R_5$ is the resistance of the variable resistor 328'. Similarly, the variable resistors 327', 326', 325' and 324' are so adjusted that the outputs appearing on the lead 321 in response to the throttle valve openings of $S_{\theta(4)}$, $S_{\theta(3)}$, $S_{\theta(2)}$ and $S_{\theta(1)}$ are given by $E_{(4)}$, $E_{(3)}$, $E_{(2)}$ and $E_{(1)}$, respectively. Thus, the voltages $E_{(1)}$, $E_{(2)}$, $E_{(3)}$, $E_{(4)}$, $E_{(5)}$, $E_{(6)}$ and $E_{(7)}$ appear on the lead 321 in response to the throttle valve opening $S_\theta$ of $S_{\theta(1)}$, $S_{\theta(2)}$, $S_{\theta(3)}$, $S_{\theta(4)}$, $S_{\theta(5)}$, $S_{\theta(6)}$ and $S_{\theta(7)}$, respectively. In other words, a stepped signal voltage $E_{(N)}$ ($N = 1, 2, 3, 4, 5, 6, 7$) is delivered from the circuit 320 to the lead 321 depending on the opening of the throttle valve. The switch 322 is shown as having six stationary contacts for obtaining seven different outputs. It is apparent that the number of stationary contacts may be further increased in order to obtain a more complex stepped signal.

The 1-2 shift point computer circuit 358 includes a discriminating circuit 330 and a feedback circuit 340. The discriminating circuit 330 and the feedback circuit 340 have a structure as shown in FIG. 17. The discriminating circuit 330 includes a comparator 335 of any suitable conventional type such as one sold under the code No. μpc 71 by Nippon Electric Co., Ltd. (as shown in detail in FIG. 11b of the copending Wakamatsu et al. application, Ser. No. 858,300 filed Sept. 16, 1969) or N72710N supplied by Texas Instruments Co., Ltd. An input resistor 336 is connected at one end to an input terminal 335a of the comparator 335 and at the other end to the movable arm of a variable resistor 337. The variable resistor 337 is connected across the input terminals 333 and 334 of the discriminating circuit 330. A resistor 338 is connected at one end to the movable arm of a variable resistor 339 and at the other end to an input terminal 335b of the comparator 335. The variable resistor 339 is connected at one end to the input terminal 332 of the discriminating circuit 330 and is grounded at the other end. Terminals 335c, 335d and 335e of the comparator 335 are connected to the positive terminal of a power source, to ground and to the negative terminal of the power source, respectively. The feedback circuit 340 includes an NPN transistor 341, a resistor 342 and a variable resistor 343. The NPN transistor 341 has its emitter grounded and its base connected to the output lead 331 of the discriminating circuit 330 through the resistor 342. The collector of the transistor 341 is connected to the fixed terminal of the variable resistor 343 and the junction point therebetween is connected to the input terminal 334 of the discriminating circuit 330. The variable contact of the variable resistor 343 is grounded.

In operation, assuming that a voltage or "1" appears on the output lead 331 when no signal is supplied to the input terminals 332, 333 and 334, then a base current is supplied through the resistor 342 to the transistor 341 in the feedback circuit 340 with the result that the transistor 341 conducts and the variable resistor 343 is shorted there-across. Then, when a voltage signal $E_{(N)}$ ($N = 1, 2, 3, ...$) representing the throttle position and a voltage signal $E_n$ representing the output shaft r.p.m. are applied to the respective input terminals 332 and 333 of the discriminating circuit 330, a voltage $En' = (Rb)/(Ra + Rb)$. En appears at the movable arm of the variable resistor 337, where Ra is the resistance between the input terminal 333 and the movable arm of the variable resistor 337, Rb is the resistance between the movable arm of the variable resistor 337 and the collector of the transistor 341 in the feedback circuit 340, and Rc is the resistance of the variable resistor 343. A voltage $E_{(N)}'$ appears at the movable arm of the variable resistor 339 and is given by $E_{(N)}' = (Re)/(Rd + Re) \cdot E_{(N)}$, where Rd is the resistance between the movable arm of the variable resistor 339 and the input terminal 332, and Re is the resistance between the movable arm of the variable resistor 339 and ground.

The voltage $En'$ is applied to the input terminal 335a of the comparator 335 through the resistor 336, and the voltage $E_{(N)}'$ is applied to the input terminal 335b of the comparator 335 through the resistor 338. The comparator 335 compares $E_{(N)}'$ with $En'$. Thus, when $En' - E_{(N)}'$ is positive, no signal voltage or "0" is delivered from the comparator 331, while when $En' - E_{(N)}'$ is negative, a signal voltage or "1" is delivered from the comparator 335 to appear on the output lead 331. The resistors 336 and 338 are protective resistors which protect the comparator 335 against any large inputs that may be applied to the input terminals of the comparator 335. The comparator 335, as detailed in the above mentioned Wakamatsu et al. application, Ser. No. 858,300, may be composed of a differential amplifier and a Zener diode or a Schmitt circuit. When "0" or no output voltage appears on the output lead 331 of the discriminating circuit 330 due to $En' - E_{(N)}' > 0$, no base current is supplied to the base of the transistor 341 in the feedback circuit 340 through the resistor 342 thereby to turn off the transistor 341. Therefore, the potential at the input terminal 335a of the comparator 335 is now given by $En'' = (Rb + Rc)/(Ra + Rb + Rc) \cdot$ En which is larger than $En'$ or $En'' > En'$ in spite of the fact that En remains the same. Thus, the output appearing on the output lead 331 of the comparator 335 turns from "0" to "1" at a smaller value of $En$ (that is, at a lower vehicle speed) than when the output turns from "1" to "0." In other words, the amount of modification of the signal En representing the output shaft r.p.m. by the resistances is varied by means of the feedback circuit 340 depending on whether the output appearing on the output lead 331 of the discriminating circuit 330 is "0" or "1" so as to thereby vary the discriminating condition of the discriminating circuit 330. By this method, a stable signal appears on the output lead 331 and no hunting would occur.

It will thus be seen that the relation $En = AE_{(N)}$ holds between the signal En representing the output shaft r.p.m. and the signal $E_{(N)}$ representing the throttle position when the output signal appearing on the output lead 331 of the discriminating circuit 330 is changed from "1" to "0," and the relation $En = A'E_{(N)}$ holds between these two signals when the output signal appearing on the output lead 331 is changed from "0" to "1." These two equations can be computed by suitably setting the variable resistors 337, 339 and 343 in the discriminating circuit 330 and feedback circuit 340 constituting the 1-2 shift point computer circuit 358. Thus, the output signal appearing on the output lead 331 varies from "1" to "0" or the output voltage ceases to appear thereon when En is increased to make a shift to the right-hand side of the curve $En = AE(N)$ in FIG. 18. When En is decreased in the absence of the output voltage until the relation $En \leq A'E(N)$ is thereby achieved, the signal voltage appears on the output lead 331 again.

The amplifier 350 is a conventional one, and its sole function is the amplification of the output signal from the discriminating circuit 330 for energizing the solenoid 132. The amplifier 350 is unnecessary when the output signal from the discriminating circuit 330 can satisfactorily energize the solenoid 132. The solenoid 132 is well known in the art and any description of it is unnecessary. It is apparent that an alternative circuit arrangement may be employed so that "0" is delivered from the discriminating circuit 330 to appear on the output lead 331 when $En - E(N) < 0$, while "1" appears on the output lead 331 when $En - E(N) > 0$ and the solenoid 132 is energized in response to the appearance of "1" on the output lead 331. Although the illustrated example refers to the case in which the feedback circuit 340 acts to vary the potential at the input terminal 335a, the same result can be obtained by varying the potential at the input terminal 335b in a manner contrary to the variation of the potential at the input terminal 335a.

The digital-analog converter 310 is so constructed that a gradually increasing positive voltage appears on the output lead 312 as the frequency supplied through the input lead 312, hence the speed of the vehicle is increased. The output lead 321 of the throttle position responsive circuit 320 may be connected with the output lead 312 of the digital-analog converter 310, and the input terminal 332 of the discriminating circuit 330 which has been connected with the output lead 321 of the throttle position responsive circuit 320 may be connected to ground or to a source of fixed voltage to obtain a zero balance. The throttle position responsive circuit 320 may be so constructed that the resistance between the output thereof and ground is reduced as the opening of the throttle valve is increased.

The digital-analog converter 310 may be so constructed that a gradually decreasing negative voltage appears on the output lead 312 as the speed of the vehicle is increased. In this case too, the throttle position responsive circuit 320 may be such that the resistance between the output thereof and ground is reduced as the opening of the throttle valve is increased, and the output of the digital-analog converter 310 and the output of the throttle position responsive circuit 320 may be connected in common to the input terminal 333 of the discriminating circuit 330, while the input terminal 332 of the discriminating circuit 330 may be connected to ground or to a source of fixed voltage for obtaining a zero balance.

The 2-3 shift point computer circuit 363 includes a first shift point computing circuit 361, a second shift point computing circuit 362, a switch means 352 associated with the second shift point computing circuit 362, and an OR circuit 354. The first shift point computing circuit 361 has a structure entirely the same as the 1-2 shift point computer circuit 358. Thus, the first shift point computing circuit 361 is composed of a discriminating circuit 330' and a feedback circuit 340'. Variable resistors in the discriminating circuit 330' and feedback circuit 340' are suitably set so as to compute the relation $En = BE(N)$ between the signal $EN$ representing the output shaft r.p.m. and the signal $E(N)$ representing the throttle position when the signal appearing on an output lead 331' varies from "1" to "0" and to compute the relation $EN = B'E(N)$ between these two signals when the signal appearing on the output lead 331' varies from "0" to "1." Referring to FIG. 18, when the signal En representing the output shaft r.p.m. is increased to such an extent that the relation $En \geq B(N)$ is satisfied, no signal voltage appears on the output lead 331', that is, a variation from "1" to "0" takes place. When subsequently En is decreased to such an extent that the relation $En \leq B'E(N)$ is satisfied, a voltage appears on the output lead 331'.

The second shift point computing circuit 362 is composed of a discriminating circuit 330'', a feedback circuit 340'' and a reference voltage means 360. The second shift point computing circuit 362 is similar to the 1-2 shift point computer circuit 358 in the structure of the discriminating circuit 330'' and feedback circuit 340''. Referring to FIG. 17, the 1-2 shift point computer circuit 358 has been such that the signal representing the throttle position is supplied to the input terminal 332 of the discriminating circuit 330, but in the case of the second shift point computing circuit 362 wherein like reference numerals are used to denote like parts appearing in FIG. 17, a fixed voltage Ec (which is a suitable fixed voltage to establish the lines $EN = CEc$ and $En = C'Ec$ in FIG. 18) is supplied to an input terminal 332'' of the discriminating circuit 330'' in lieu of the signal representing the throttle position. This voltage is suitably divided by a variable resistor 339'' so that a fixed voltage $Ec'$ is applied to an input terminal 335b'' of a comparator 335'' through a resistor 338''. The signal En representing the output shaft r.p.m. is applied to another input terminal 333'' of the discriminating circuit 330'' as explained in the description related to the 1-2 shift point computer circuit 358. Due to the provision of variable resistors 337'' and 343'', a signal $En'$ and a signal $En''$ are applied to an input terminal 335a'' of the comparator 335'' through a resistor 336'' when "1" and "0" appear on an output lead 331'', respectively. The input voltages applied to the two input terminals 335a'' and 335b'' are compared with each other by the comparator 335.

The signal voltage or "1" having appeared on the output lead 331'' is changed to "0" when the condition $En' \geq Ec'$ is satisfied, that is, when a shift to the right-hand or high speed side of the line $EN = CEc$ in FIG. 18 occurs. On the other hand, "0" having appeared on the output lead 331'' is returned to "1" when the condition $En'' \leq Ec'$ is satisfied, that is, when a shift to the left-hand or low speed side of the line $En = C'Ec$ in FIG. 18 occurs.

In this manner, the second shift point computing circuit 362 compares the signal En representing the output shaft r.p.m. with the reference voltage Ec so as to set the r.p.m. of the output shaft at a certain value. Although the above description refers to the case in which the second shift point computing circuit 362 is independent of the signal representing the throttle position for the convenience of explanation, it will be understood that this circuit may be adapted to set the relation between these two signals. The output lead 331'' of the second shift point computing circuit 362 is connected to a lead 353 through the switch means 352. The outputs of the two 2-3 shift point computing circuits 361 and 362 are connected to the solenoid 137 through the OR circuit 354 described below so as to energize the solenoid 137 by the respective signals.

The output from the first shift point computing circuit 361 is applied to the OR circuit 354 through the lead 331' while the output from the second shift point computing circuit 362 is applied to the OR circuit 354 through the lead 331'', the switch means 352 and the lead 353 so that, in the presence of any one of these two signals, an output signal appears from the OR circuit 354 on a lead 355 and is amplified by the amplifier 356 to energize the solenoid 137. The amplifier 356 for energizing the solenoid 137 is unnecessary when the output signal from the OR circuit 354 can sufficiently energize the solenoid 137 without any amplification. While the 2-3 shift point computer circuit 363 has been described as having two kinds of shift point computing circuits, it will be apparent that more than two shift point computing circuits possessing a structure similar to the above may constitute the circuit 363.

SHIFT CONTROL OPERATION

The relation between the speed ratio of the transmission and the operating state of the solenoids has been given in the description concerning the hydraulic actuating system. This relation can be summarized as follows:

TABLE 1

| Gear position | Solenoid 132 | Solenoid 137 |
|---|---|---|
| First speed | Energized | Energized |
| Second speed | De-energized | Energized |
| Third speed | De-energized | De-energized |

1-2 SHIFT CONTROL

The relation between the signal En representing the output shaft r.p.m. and the signal $E(N)$ representing the throttle position shown in FIG. 18 may be expressed in terms of a relation between the vehicle speed II and the throttle position or opening $\theta$ as shown in FIG. 19.

A shift from first to second gear takes place when the driving condition of the vehicle makes a shift to the right-hand or high speed side of the curve $V = f_1(\theta)$ shown in FIG. 19. Since, in such a state, the relation $En \geq AE(N)$ holds "0" or no voltage is delivered from the discriminating circuit 330 and the solenoid 132 is de-energized this thereby causes a shift from first to second gear. In the second gear position, no voltage is supplied to the feedback circuit 340 and the NPN transistor 341 is cut off. As a result, the rate of division of the signal En representing the output shaft r.p.m. by the variable resistors is varied and now the descriminating circuit 330 starts to carry out the computation of $En \geq A'E(N)$. Therefore, the subsequent shift from second to first gear occurs on the curve $V = f_1'(\theta)$, and a shift to the left-hand or low speed side of the curve $V = f_1'(\theta)$ results in the energization of the solenoid 132 thereby shifting the gear from second to first gear. The difference between the shift point from first to second gear and the shift point from second to first gear is generally necessarily provided in automatic transmissions in order to ensure stable shifting.

2-3 SHIFT CONTROL

The shift point (line) from second to third gear determined by the first shift point computing circuit 361 is represented by the curve $V = f_2(\theta)$ shown in FIG. 19. When a shift to the right-hand or high speed side of the curve $V = f_2(\theta)$ occurs, no voltage signal appears on the output lead 331' of the discriminating circuit 330', and in the absence of any output voltage on the output lead 353 delivered from the second shift point computing circuit 362 through the switch means 352, the solenoid 137 is de-energized to cause an upshift from second to third gear. Since "0" appears on the output lead 331' of the discriminating circuit 330', no voltage is supplied to the feedback circuit 340' and the NPN transistor 341' is cut off. Thus, the computation of $En \geq B'E(N)$ is carried out by the discriminating circuit 330' as in the case of the discriminating circuit in the 1-2 shift point computer circuit 358. Therefore, in the absence of any output voltage appearing on the output lead 353, the subsequent downshift from third to second gear takes place on the curve $V = f_2'(\theta)$. A shift to the left-hand or low speed side of the curve $V = f_2'(\theta)$ results in the energization of the solenoid 137 to cause the downshift from third to second gear, provided that the solenoid 132 is kept in its de-energized state. It will be understood from the above description that the first shift point computing circuit 361 is similar to the 1-2 shift point computer circuit 358 in the manner of providing for the shift point.

When a shift to the right-hand or high speed side of the line $V = D$ in FIG. 19 occurs, the relation $En \geq CEc$ holds and "0" appears on the output lead 331" of the discriminating circuit 330" with the result that the output supplied from the discriminating circuit 331" to the OR circuit 354 in the closed position of the switch means 352 is cut off. When the output from the first shift point computing circuit 361 is also zero, no voltage is supplied from the OR circuit 354 to the solenoid 137 which is thereby de-energized and an upshift from second to third gear takes place. Since "0" appears on the output lead 331" of the discriminating circuit 330", no voltage is supplied to the feedback circuit 340" and the NPN transistor 341" is cut off. As a result, the rate of division of the signal En representing the output shaft r.p.m. by the variable resistors is varied and now the discriminating circuit 330" is ready to carry out the computation of $En \geq C'Ec$. Therefore, when a shift to the left-hand or low speed side of the line $V = D'$ in FIG. 19 occurs in third gear, "1" is delivered from the discriminating circuit 330" and is supplied through the closed switch means 352 to the OR circuit 354, thereby energizing the solenoid 137 and causing a down-shift from third to second gear.

The output leads 331' and 353 of the respective shift point computing circuits 361 and 362 constituting the 2-3 shift point computer circuit 363 are connected through the OR circuit 354 to the solenoid 137 as described above. The relation between the signals appearing on the output leads 331' and 353 and the gear position is shown in Table 2.

TABLE 2

| Gear position | Signal on lead 331' | Signal on lead 353 |
|---|---|---|
| Second speed | 1 | 1 |
| Second speed | 0 | 1 |
| Second speed | 1 | 0 |
| Third speed | 0 | 0 |

When the switch means 352 is urged to its open position, "0" appears continuously on the lead 353 leading to the OR circuit 354 and the discriminating circuit 330" in the second shift point computing circuit 362 is cut off from the solenoid 137. In this state, an upshift from second to third gear occurs on the curve $V = f_2(\theta)$ shown in FIG. 19 and a downshift from third to second gear occurs on the curve $V = f_2'(\theta)$. When, on the other hand, the switch means 352 is urged to its closed position, the second shift point computing circuit 362 in the 2-3 shift point computer circuit 363 is operatively connected with the solenoid 137 so that the gear is shifted to second gear in response to the appearance of a voltage on any one of the input leads 331' and 353 for the OR circuit 354 or the appearance of voltages on both the input leads, while the gear is shifted to third gear in response to the appearance of no voltages on these input leads. Therefore, the shift line from second to third gear is represented by a thick solid line in FIG. 19 obtained by combining the curve $V = f_2(\theta)$ with the line $V = D$, while the shift line from third to second gear is represented by a thick broken line in FIG. 19 obtained by combining the curve $V = f_2'(\theta)$ with the line $V = D'$. It will thus be understood that two sets of shift lines can be selected by opening and closing the switch means 352.

It will be understood from the foregoing description that the shift control system for the automatic transmission according to the present invention is featured by having a first set of shift lines $V = f_2(\theta)$ and $V = f_2'(\theta)$ and a second set of shift lines shown by the thick solid and broken lines in FIG. 19 for a shift between second and third gear. It is needless to say that, while two sets of shift lines are employed for a 2-3 shift in the three-forward speed automatic transmission embodying the present invention, the number of sets of shift lines is in no way limited to two and any desired number of sets of such shift lines may be employed. Further, this is applicable to a shift between gear positions in two-forward speeds, four-forward speeds and many other automatic transmissions in addition to the three-forward speeds automatic transmission referred to above.

The first set of shift lines is generally intended to apply to a drive on a level road or a normal drive, while the second set of shift lines is generally intended to apply to a drive on a mountainous road or a sporty drive. Prior art automatic transmissions have generally been designed to operate with the first set of shift lines and thus a shift occurs at a low speed when the opening of the throttle valve is small. Suppose that a vehicle designed for running with this shift pattern enters a mountainous area while in third gear of a relatively low speed range and then starts to run up an incline. Since, in this case, the running resistance is increased and the accelerating force is gradually decreased, the driver kicks down the accelerator pedal to downshift to second gear, but the release of the force imparted to the accelerator pedal immediately causes an upshift to third gear, and it is thus impossible to carry out a suitable drive by adjusting the amount of depression on the accelerator pedal. Further, on a decline or curve in a mountainous area, it is necessary to apply engine braking. However, with the first shift pattern, release of the force imparted to the accelerator pedal immediately causes a shift to third gear and it is hardly possible to apply engine braking. Furthermore, it is necessary to downshift to second gear before the vehicle is accelerated after it has been decelerated by engine braking. Thus, with the first shift pattern prepared for a drive on a level road, the gear position affects the driving conditions of the vehicle when it runs on a mountainous road or the like, and it is almost impossible to carry out the desired drive by adjusting the amount of depression of the accelerator pedal. Such a defect in the prior art automatic transmission has been compensated for by especially providing a range for low gear and selecting a suitable gear ratio by causing a shift between the range for high gear and the range for low gear as required. However, this measure has generally been unsuitable for practical applications because no automatic shift to high gear, for example, to third speed cannot be effected in the low gear range.

These defects are alleviated by the present invention in which a plurality of automatic shift patterns conforming to various driving conditions are prepared so that they may be suitably selected depending on the driver's preference. Thus, a proper shift can be carried out under all driving conditions and a drive with a wide range of varieties can be enjoyed, giving a shift operation which is quite advanced compared with that of the prior art automatic transmission system.

In the embodiment described in detail above, the shift point computing circuit 362 including the descriminating circuit 330'' is separately provided and this circuit 362 and another shift point computing circuit 361 are connected to the OR circuit 354. However, as will be apparent from the similarity of the structure of the discriminating circuits in both the computing circuits, the signal representing the throttle position and the reference voltage representing a suitable output shaft r.p.m. may be supplied to the input terminal 332' of the discriminating circuit 330' through a suitable selecting circuit so as to provide a plurality of shift points (lines) as in the embodiment of the present invention described above. A plurality of shift lines may also be obtained by suitably modifying the signal representing the throttle position or the signal representing the output shaft r.p.m. and applying this modified signal to the input terminal 332' of the discriminating circuit 330' through a selecting circuit. Many other means for obtaining a plurality of shift lines will be apparent to those skilled in the art.

Furthermore, the movable arms of the variable resistors 339 and 339' in the discriminating circuits 330 and 330' in the shift point computer circuits 358 and 361 shown in FIG. 17 may be arranged to be moved by suitable means so as to freely transfer the curves $V = f_1(\theta)$ and $V = f_2(\theta)$ in the shift pattern shown in FIG. 19 in the direction of the horizontal axis representing the vehicle speed. By this means, the shift lines in the shift pattern can be set at any desired positions that are relative to the vehicle speed.

In this case, however, the variation in the characteristic of the shift pattern, such as the variation of $V = f_2(\theta)$ to $V = D$ previously described is impossible.

The movable arm of the variable resistor 339'' in the discriminating circuit 330'' when it receives a reference voltage from the reference voltage means 360 in the second shift point computing circuit 362 in the computer circuit 363 may be arranged to be moved by a suitable means so as to freely transfer the shift lines $V = D$ and $V = D'$ in the shift pattern shown in FIG. 19 in the direction of the horizontal axis representing the vehicle speed as in the preceding case. The suitable means described above may, for example, be a shift point change lever or a dial disposed adjacent to the driver's seat. The shift lines $V = D$ and $V = D'$ can be freely set by this means at any position desired by the driver.

While an embodiment of the present invention has been described with reference to a three-forward speed and one-reverse speed automatic transmission, it will be apparent for those skilled in the art that various changes and modifications may be made therein without departing from the scope of the appended claims.

What is claimed is:

1. In an automatic transmission for an engine-driven vehicle having a torque converter coupled to a gear unit having gears and frictionally engaging means for accomplishing the selective meshing engagement of said gears in said gear unit, an automatic shift control system comprising:

a hydraulic actuating circuit means including a manual fluid valve having a first position for establishing a relatively high forward driving ratio and a second position for establishing a relatively low forward driving ratio and shift valve means disposed in fluid communication passages between said manual valve and said frictionally engaging means for selectively actuating said frictionally engaging means;

electrical signal generating means connected to said vehicle and including at least one signal generator for generating an electrical output signal representing at least one shift determining type of vehicle operating condition;

electrical shift point computing means coupled between said generating means and shift valve means for automatically computing shift point signals representing an automatic shifting pattern for actuating said shift valve means as a function of the output of said signal generating means; and control means for varying said automatic shifting pattern thereby varying the shift point even though said manual fluid valve is maintained in said first position whereby a suitable shift point may be manually selected as desired depending on the varying driving conditions of the vehicle.

2. In an automatic transmission for an engine-driven vehicle having an engine throttle, said transmission being of the kind having an output shaft and a torque converter coupled to a gear unit containing gears for driving said shaft and having frictionally engaging means for accomplishing the selective meshing engagement of the gears in said gear unit, an automatic shift control system comprising:

a hydraulic actuating circuit including a manual shift region setting valve and a distributing valve for distributing fluid under pressure to said frictionally engaging means for controlling said frictionally engaging means, first means connected to said throttle for generating a first signal responsive to the engine throttle position, second means connected to said transmission output shaft for generating a second signal responsive to the r.p.m. of the output shaft of said transmission, a plurality of discriminating circuit means connected to said first and second means for generating an output signal when the relation between said first and second signals satisfies a predetermined condition, switch means connected with at least one of said discriminating circuits for permitting or interrupting the delivery of the output signal from said discriminating circuit, and OR circuit means coupled to said discriminating circuits for generating an electrical output signal for triggering actuation of said frictionally engaging means when at least one of the signals from said discriminating circuits is applied thereto directly or through said switch means.

3. In a shift control system for a vehicle transmission which includes a transmission gear assembly, engaging means coupled to said assembly for effecting gear shifting engagement of said transmission gear assembly, and shifting means coupled to said engaging means for operating said engaging means, the improvement comprising:

electrical signal generator means connected to said vehicle for producing electrical output signals representative of shift determining operating conditions of the vehicle, computing circuit means connected to the output of said signal generator means for acting upon the output signals therefrom to establish a shift condition, means connected to the output of said computing circuit means for actuating said shifting means, a shift condition modification circuit connected between said computing circuit means and said actuating means for varying said shift condition when said modification circuit is energized and means coupled to said shift condition modification circuit for manually affecting energization thereof.

4. The shift control system of claim 3 wherein said signal generating means comprises a toothed disc of magnetic material securely mounted coaxially on the output shaft of said vehicle transmission and a coil located adjacent to the outer periphery of said toothed disc the axis of said coil being located on a line radial to said disc whereby a voltage having a frequency proportional to the rotational speed of said output shaft is induced in said coil.

5. The shift control system of claim 4 further including a digital to analog converter electrically connected between said coil and said establishing circuit.

6. The shift control system of claim 3 wherein said signal generating means comprises a movable contact mechanically connected with the carburetor throttle of said vehicle, a plurality of fixed contacts arranged to engage with said movable contact, each of said fixed contacts being connected through a separate resistance to a source of electrical power, and a voltage tap line connected in common between said resistances and said power source wherein the movement of said carburetor throttle causes said movable contact to engage a varying number of fixed contacts and thus to vary the output voltage on said voltage tap line proportional to the setting of said carburetor throttle.

7. The shift control system of claim 3 wherein said signal generating means comprises a toothed disc of magnetic material securely mounted coaxially on the output shaft of said vehicle transmission and a coil located adjacent to the outer periphery of said toothed disc the axis of said coil being located on a line radial to said disc whereby a voltage having a frequency proportional to the rotational speed of said output shaft is induced in said coil, and a movable contact mechanically connected with the carburetor throttle of said vehicle, a plurality of fixed contacts arranged to engage with said movable contact each of said fixed contacts connected through a separate resistance to a source of electrical power and a voltage tap line connected in common between said resistances and said power source wherein the movement of the carburetor throttle causes said movable contact to engage a varying number of said contacts and thus to vary the output voltage on said voltage tap line proportional to the carburetor throttle setting.

8. The shift control system of claim 3 wherein said shifting means comprises a source of pressurized liquid and a hydraulic system having at least one valve for controlling the flow of liquid within said hydraulic system and at least one hydraulic operator in liquid connection with said hydraulic system and in mechanical connection with said engaging means for operating said engaging means.

9. The shift control system of claim 8 wherein said engaging means comprises at least one clutch and said hydraulic operator comprises a servo chamber mechanically adapted to cause the engagement of said clutch.

10. The shift control system of claim 8 wherein said engaging means comprises at least one brake band and said hydraulic operator comprises a servo chamber mechanically adapted to cause the engagement of said brake band.

11. The shift control system of claim 3 wherein said signal generating means produces two signals and said establishing circuit comprises a comparator having first and second input leads and an output lead, one of said two signals being applied to said first input lead and the other of said two signals being applied to said first input lead, said comparator producing an output on said output lead only when said first signal exceeds said second signal.

12. The shift control system of claim 11 further including a feedback circuit connected between said output lead of said comparator and said first input lead thereof for adding a portion of the output signal produced by said comparator to the input signal at said first input lead whereby signals on said output lead are stabilized.

13. The shift control system of claim 12 wherein said shift modification circuit comprises a second comparator which is electrically identical to the first comparator and has electrically identical input and output leads but differs from said first comparator in that a reference signal is applied to the second input lead of said second comparator whereby said second comparator produces a different output from said first comparator and an electrical "or" gate to which the output leads of said first and second comparators are connected as inputs and from which an output lead extends which is connected to said actuating means and means causing said "or" gate to connect either said first or said second comparator to said actuating means.

14. The shift control system of claim 13 wherein the means for energizing said shift condition modification circuit comprises a switch connected between said second comparator and said "or" gate.

15. In an automatic transmission for an engine-driven vehicle having a torque converter coupled to a gear unit having gears and frictionally engaging means for accomplishing the selective meshing engagement of gears in said gear unit to effect shifting between various gear ratios, an automatic shift control system comprising:

hydraulic actuating means including a manually controlled fluid valve connected to said frictionally engaging means for selectively actuating said frictionally engaging means to effect said shifting in response to supplied electrical shift point signals, electrical signal generating means connected to said vehicle for being responsive to at least one gear shift determining type of vehicle operating conditions for supplying electrical output signals representative thereof, computing means connected between said signal generating means and said hydraulic actuating means for automatically computing and supplying as an output a first set of electrical shift point signals as a first function of said vehicle operating conditions corresponding to a first shift pattern suitable for a first driving environment, further means connected to said computing means for effecting a change in the output thereof to a second set of electrical shift point signals as a second function of said vehicle operating conditions corresponding to a second shift pattern suitable for a second driving environment, and manual switch means for manually activating said further means independently of said manually controlled fluid valve whereby a driver of said vehicle may manually change the system operation, from said first shift pattern to said second shift pattern upon detecting a change from said first to said second driving environment.

16. An automatic shift control system as in claim 15 wherein said hydraulic actuating means includes electrically operated solenoid valves which are spring biased to an up-shifted position so that no electrical operating power is required during high gear operation.

17. An automatic shift control system as in claim 16 wherein said manually controlled fluid valve effects completely manual control over said shifting between various gear ratios when said electrically operated solenoid valves are in their spring biased positions.

18. An automatic shift control system as in claim 15 wherein:

said further means comprises a second computing means connected to said signal generating means for automatically supplying second output signals as a function of at least one of said shift determining vehicle operating conditions and an OR circuit connected to both of said computing means for effectively combining said first set of electrical shift point signals with said second output signals to produce said second set of electrical shift point signals, and said manual switch means is connected to the output of said second computing means for effectively disconnecting said second output signals from said OR circuit in response to manual actuation by a driver of the vehicle.

* * * * *

UNITED STATES PATENT OFFICE
CERTIFICATE OF CORRECTION

Patent No. 3,680,411           Dated August 1, 1972

Inventor(s) Shin ITO and Seitoku KUBO

It is certified that error appears in the above-identified patent and that said Letters Patent are hereby corrected as shown below:

Page 1, Item 72, change "Toyota" to --Toyota-shi--.

Page 1, Item 73, (omitted entirely) insert --Assignee

Toyota Jidosha Kogyo Kabushiki Kaisha, Toyota-shi, Japan--.

Signed and sealed this 3rd day of April 1973.

(SEAL)
Attest:

EDWARD M.FLETCHER,JR.           ROBERT GOTTSCHALK
Attesting Officer           Commissioner of Patents